US012771471B2

(12) United States Patent
Guo et al.

(10) Patent No.: US 12,771,471 B2
(45) Date of Patent: Oct. 20, 2026

(54) ON-CHIP INTEGRATED WAVELENGTH DIVISION MULTIPLEXER AND CHIP

(71) Applicant: PICMORE TECHNOLOGY (SUZHOU) LTD., Suzhou (CN)

(72) Inventors: Defen Guo, Suzhou (CN); Tianhua Lin, Suzhou (CN); Xianyao Li, Suzhou (CN)

(73) Assignee: PICMORE TECHNOLOGY (SUZHOU) LTD., Suzhou (CN)

( * ) Notice: Subject to any disclaimer, the term of this patent is extended or adjusted under 35 U.S.C. 154(b) by 159 days.

(21) Appl. No.: 18/836,694

(22) PCT Filed: Nov. 18, 2022

(86) PCT No.: PCT/CN2022/132889

§ 371 (c)(1),
(2) Date: Aug. 7, 2024

(87) PCT Pub. No.: WO2023/147736

PCT Pub. Date: Aug. 10, 2023

(65) Prior Publication Data

US 2025/0038877 A1 Jan. 30, 2025

(30) Foreign Application Priority Data

Feb. 7, 2022 (CN) ........................ 202210116737.4

(51) Int. Cl.
*H04J 14/02* (2006.01)

(52) U.S. Cl.
CPC ...... *H04J 14/0307* (2023.08); *H04J 14/0209* (2013.01)

(58) Field of Classification Search
CPC .......................... H04J 14/0307; H04J 14/0209
(Continued)

(56) References Cited

U.S. PATENT DOCUMENTS 6,678,476 B1 1/2004 Hou
11,002,980 B1 5/2021 Ling et al.
(Continued)

FOREIGN PATENT DOCUMENTS

CN 105891960 A 8/2016
CN 108508539 A 9/2018
(Continued)

OTHER PUBLICATIONS

Extended European Search Report for corresponding European Application No. 22924663.2, dated Jan. 30, 2026.
(Continued)

*Primary Examiner* — Dalzid E Singh
(74) *Attorney, Agent, or Firm* — Finnegan, Henderson, Farabow, Garrett & Dunner, LLP

(57) ABSTRACT

An on-chip integrated wavelength division multiplexer, including a bus waveguide and at least two cascaded wavelength division multiplexing units disposed on the bus waveguide. Each of the wavelength division multiplexing units comprises two input ports and one output port, and is used for combining two optical signals received by the two input ports and outputting the combined optical signal from the output port, so as to implement multiplexing of incident optical signals of different wavelengths. By means of the structure in which the at least two wavelength division multiplexing units are cascaded, a relatively wide and flat-top passband can be provided for the on-chip integrated wavelength division multiplexer.

21 Claims, 9 Drawing Sheets

(58) Field of Classification Search
USPC .......................................................... 398/87
See application file for complete search history.

(56) References Cited

U.S. PATENT DOCUMENTS

| | | | | |
|---|---|---|---|---|
| 12,395,263 | B2 * | 8/2025 | Tambasco | G02B 6/14 |
| 2004/0096155 | A1 | 5/2004 | Singh et al. | |
| 2018/0059328 | A1 | 3/2018 | Shi | |
| 2022/0137299 | A1 * | 5/2022 | Su | H04J 14/0307 385/24 |
| 2022/0390678 | A1 * | 12/2022 | Guo | G02B 6/29352 |
| 2022/0416930 | A1 * | 12/2022 | Dai | G02B 6/2938 |
| 2023/0224040 | A1 * | 7/2023 | Lin | G02B 6/124 398/147 |

FOREIGN PATENT DOCUMENTS

| | | | |
|---|---|---|---|
| CN | 109407209 | A | 3/2019 |
| CN | 109709643 | A | 5/2019 |
| CN | 109870767 | A | 6/2019 |
| CN | 110850524 | A | 2/2020 |
| CN | 111736266 | A | 10/2020 |
| CN | 213661636 | U | 7/2021 |
| CN | 113406747 | A | 9/2021 |
| WO | 2021184042 | A1 | 9/2021 |

OTHER PUBLICATIONS

Chinese Official Action for corresponding Chinese Patent Application No. 202210116737.4, dated Jan. 30, 2026.
International Search Report issued in corresponding International Application No. PCT/CN2022/132889 dated Feb. 20, 2023.

* cited by examiner

ON-CHIP INTEGRATED WAVELENGTH DIVISION MULTIPLEXER AND CHIP

CROSS-REFERENCE TO RELATED APPLICATION

The present application is a U.S. National Stage of International Application No. PCT/CN2022/132889, filed on Nov. 18, 2022, which claims priority to Chinese Application No. 202210116737.4, filed Feb. 7, 2022, the entire contents of both of which are incorporated herein by reference.

TECHNICAL FIELD

The present application relates to the field of optical communication, and more particularly, to an on-chip integrated wavelength division multiplexer and a chip.

BACKGROUND ART

As today's information society continues to develop, demand for optical transmission capacity and bandwidth is growing exponentially, and the demand for high capacity optical interconnects is growing rapidly. It is well known that wavelength division multiplexing (WDM) technology is an effective means to increase the capacity of optical communications; and, when combined with photonic integrated chip technology, it can effectively reduce the size of devices and increase the level of system integration. For dense wavelength division multiplexing (DWDM) systems with narrow channel spacing (e.g. 0.8 nm), the main challenge is that they are highly sensitive to small wavelength shifts of their laser sources or DWDM filters. For example, wavelength shifts caused by changes in ambient temperature are usually very detrimental to silicon-based DWDM; therefore, silicon-based DWDM devices typically require additional wavelength tuning and fine-tuning structures that are complex and expensive.

In contrast, more people choose coarse wavelength division multiplexing (CWDM) technology due to its larger channel spacing (e.g. 20 nm); with increased channel spacing, it is less sensitive to wavelength shifts and allows for significant relaxation of wavelength control requirements for lasers and WDM filters. Therefore, it has become more popular for short-distance optical interconnects, such as in data centers. Common CWDM device structures include arrayed waveguide gratings (AWG), etched diffraction gratings, and Bragg gratings. Here, CWDM filters based on AWG/etched diffraction gratings allow for lower crosstalk, but they have drawbacks, such as nonflat tops and larger additional losses. CWDM devices based on Bragg gratings have lower additional losses (<1 dB) and larger 1 dB bandwidth, but they have higher crosstalk.

In high-speed and large-capacity optical communication, wavelength division multiplexing (WDM) is an effective means to increase the capacity of optical communication; when combined with a photonic integrated chip, it can effectively reduce the size of devices and increase the level of system integration. Here, the key devices are wavelength division multiplexer devices (MUX) and wavelength division demultiplexer devices (DEMUX). Planar waveguide MUX structures mainly include arrayed waveguide gratings, etched diffraction gratings, and cascaded Mach-Zehnder interferometers (MZI). A planar waveguide MUX in commonly used technologies typically has the following structure:

As shown in FIG. 1*a*, in which four-channel wavelength division multiplexing is illustrated as an example, a commonly used wavelength division multiplexer based on the cascaded Mach-Zehnder interferometer (MZI) structure in a silicon optical chip is made of 3 Mach-Zehnder interferometers 10' connected in a parallel and cascaded manner, where each of the Mach-Zehnder interferometers 10' includes two 2×2 3 dB couplers 11' and two connecting arms 12' and one monitoring detector 13', wherein one of the connecting arms is an adjustable phase shift arm (represented by a dashed line in the figure). The aforementioned commonly used wavelength division multiplexer requires closed-loop adjustment of the adjustable phase shift arm of each cascaded Mach-Zehnder interferometer 10' in combination with the monitoring detector 13', resulting in an inconvenient adjustment process and high power consumption. And, a heating element needs to be configured near the phase shift arm; the heating element is used for changing the value of an optical parameter of the phase shift arm by changing the heating element's own temperature, so as to adjust the phase of an optical signal passing through the phase shift arm accordingly. However, the configuration of the heating element needs to consume additional power, and thermal crosstalk between different heating elements may be present. Moreover, the 3 dB couplers 11' have a limited optical bandwidth; therefore, the presence of the plurality of the 3 dB couplers 11' in the optical path of a wavelength division multiplexer having the plurality of the cascaded Mach-Zehnder interferometers 10' significantly degrades the performance of the wavelength division multiplexer. Furthermore, the aforementioned commonly used wavelength division multiplexer is not conducive to testing and determining the performance of photonic integrated chips at the wafer level.

FIG. 1*b* shows a commonly used wavelength division multiplexing device based on an arrayed waveguide grating structure in a silicon optical chip; the arrayed waveguide grating structure 130' includes a plurality of arrayed waveguides 131' (also referred to as waveguide channels), and the arrayed waveguides 131' use a linear waveguide structure. For example, in the operation of four-channel wavelength division multiplexing, four incident optical signals λ1, λ2, λ3, and λ4 are combined into one beam of a first-level combined optical signal (λ1/λ2/λ3/λ4) after phase modulation by the plurality of array waveguides 131' in the arrayed waveguide grating structure 130'. The device suffers from greater losses as a result of the need for a single-mode flat-top structure for this commonly used wavelength division multiplexer based on an arrayed waveguide grating structure, and it is more difficult to ensure the stability of center wavelengths of the wavelength division multiplexing device.

FIG. 1*c* shows a commonly used wavelength division multiplexing device based on an etched diffraction grating structure in a silicon photonic chip. The etched diffraction grating structure 140' includes an input waveguide (141', 142', 143', 144'), an output waveguide 145', a Rowland circle 150', and a concave grating 151'. Inside the Rowland circle 150' is a free propagation zone; a reflective surface of the concave grating 151' is formed of a plurality of subsurfaces (not shown in the figure); and the plurality of subsurfaces are capable of realizing multiplexing of optical signals. Here, the input waveguide (141', 142', 143', 144') and the output waveguide 145' are both disposed on the Rowland circle 150'. For example, in the operation of four-channel wavelength division multiplexing, four incident optical signals λ1, λ2, λ3, and λ4 create four input mode spots after entering the inside of the Rowland circle 150'. Subsequently, the four input mode spots enter the free propagation zone of the Rowland circle 150' and propagate, and are incident on the reflective surface of the concave grating 151'. After they are reflected and focused by the concave grating 151', one beam of a first-level combined optical signal (λ1/λ3) is outputted from the output waveguide 145'. The device suffers from greater losses as a result of the need for a single-mode flat-top structure for this commonly used wavelength division multiplexer based on an etched diffraction grating structure, and it is difficult to ensure the stability of center wavelengths of the wavelength division multiplexing device.

An ideal wavelength division multiplexing device should be purely passive and have no need to be adjusted. However, since an optical waveguide device in a silicon-based wavelength division multiplexer will be affected by variations in the width and angle of inclination caused by its processing technique, variations in the thickness of the silicon waveguide, and variations in the temperature, will result in center wavelength shifting of the silicon-based wavelength division multiplexing device. Therefore, in a commonly-used silicon-based wavelength division multiplexing device, the center wavelength shifting will lead to crosstalk between optical signals of the adjacent channels.

SUMMARY

Technical Problem

The purpose of the present disclosure is to provide an on-chip integrated wavelength division multiplexer and a chip, which have characteristics such as low loss, a relatively wide and flat-top passband, and pure passivity, and can solve the problem of center wavelength shifting of a wavelength division multiplexing device.

Solution to Problem

Technical Solution

According to one aspect of the disclosure, an on-chip integrated wavelength division multiplexer is provided, and the wavelength division multiplexer includes a bus waveguide and at least two cascaded wavelength division multiplexing units disposed on the bus waveguide; each of the wavelength division multiplexing units includes two input ports and one output port, and is used for combining two optical signals received by the two input ports and outputting the combined optical signal from the output port, wherein the two input ports of a first-level wavelength division multiplexing unit are used for receiving incident optical signals having different polarization states, respectively, or, one of the two input ports of the first-level wavelength division multiplexing unit is used for receiving one beam of incident optical signal having a polarization state, and the other is not used for receiving any optical signal;

one of the two input ports of each non-first-level wavelength division multiplexing unit is used for receiving an incident optical signal and the other is used for receiving a combined optical signal outputted from a previous-level wavelength division multiplexing unit, and incident optical signals received by two non-first-level wavelength division multiplexing units corresponding to adjacent input center wavelengths have different polarization states; wherein each of the incident optical signal has a different wavelength.

According to one embodiment of the disclosure, each of the wavelength division multiplexing units is made of any of the following structures: a combined structure made of a mode multiplexer and a multimode Bragg grating, or a backward Bragg grating directional coupler structure.

According to one embodiment of the disclosure, the wavelength division multiplexer further includes at least one polarization rotator for receiving an original incident optical signal and changing a polarization state of the original incident optical signal, all original incident optical signals having the same polarization state; wherein, for the two input ports of the first-level wavelength division multiplexing unit that are used for receiving incident optical signals having different polarization states, respectively, one of the two input ports of the first-level wavelength division multiplexing unit receives the optical signal whose polarization state has been changed from the original incident optical signal by a corresponding polarization rotator as the incident optical signal, and the other input port directly receives the original incident optical signal as its incident optical signal; for two adjacent non-first-level wavelength division multiplexing units, one of them receives the optical signal whose polarization state has been changed from the original incident optical signal by a corresponding polarization rotator as the incident optical signal, and the other input port directly receives the original incident optical signal as its incident optical signal.

According to one embodiment of the disclosure, each of the polarization rotators changes an original polarization state of the original incident optical signal received to a polarization state perpendicular to the original polarization state.

According to one embodiment of the disclosure, a difference between center wavelengths of two incident optical signals having adjacent wavelengths in a same polarization state is greater than a preset wavelength difference threshold.

According to one embodiment of the disclosure, there is a predetermined wavelength spacing between each of the incident optical signals, and a corresponding input port of the wavelength division multiplexing unit of each level receives its corresponding incident optical signal in forward or reverse order of the magnitude of its wavelength starting from the first level of the cascaded wavelength division multiplexing units.

According to one embodiment of the disclosure, the on-chip integrated wavelength division multiplexer is a silicon-based wavelength division multiplexer.

According to one embodiment of the disclosure, the wavelength division multiplexing unit of each level has a combined structure made of a mode multiplexer and a multimode Bragg grating; wherein, for each of the wavelength division multiplexing units: the mode multiplexer in the wavelength division multiplexing unit includes a first port, a second port, and a third port, the first port and the second port being used for outputting a combined optical signal and receiving the corresponding incident optical signal, respectively, and the third port being connected to an output port of the multimode Bragg grating in the wavelength division multiplexing unit; if the wavelength division multiplexing unit is a non-first-level wavelength division multiplexing unit, then one end of the multimode Bragg grating in the wavelength division multiplexing unit is used for receiving a combined optical signal outputted from a previous-level wavelength division multiplexing unit, and another end is connected to the third port of the mode multiplexer in the wavelength division multiplexing unit; if the wavelength division multiplexing unit is a first-level wavelength division multiplexing unit, then one end of the multimode Bragg grating in the wavelength division multiplexing unit is used for receiving a corresponding incident optical signal, and another end is connected to the third port of the mode multiplexer in the wavelength division multiplexing unit.

According to one embodiment of the disclosure, each of the mode multiplexers includes a straight-through waveguide and a cross waveguide; two ends of the straight-through waveguide serve as the first port and the third port, respectively, and one end of the cross waveguide near the first port serves as the second port; wherein the straight-through waveguide and the cross waveguide are used for mode coupling.

According to one embodiment of the disclosure, for each wavelength division multiplexing unit, a grating period of the multimode Bragg grating matches a wavelength of an original incident optical signal of the wavelength division multiplexing unit.

According to one embodiment of the disclosure, the wavelength division multiplexing unit of each level is made of a backward Bragg grating directional coupler structure; the backward Bragg grating directional coupler in the wavelength division multiplexing unit includes a fourth port, a fifth port, and a sixth port, and the fourth port and the fifth port are used for receiving the corresponding incident optical signal and outputting a combined optical signal, respectively; if the wavelength division multiplexing unit is a non-first-level wavelength division multiplexing unit, then the sixth port of the backward Bragg grating directional coupler in the wavelength division multiplexing unit is used for receiving a combined optical signal outputted from a previous-level wavelength division multiplexing unit; if the wavelength division multiplexing unit is the first-level wavelength division multiplexing unit, then the sixth port of the backward Bragg grating directional coupler in the wavelength division multiplexing unit is used for receiving a corresponding incident optical signal.

According to one embodiment of the disclosure, a spectrum of the incident optical signal of each of the wavelength division multiplexing units includes at least one 1 dB flat-top, wherein, each of the 1 dB flat-tops is a wavelength range corresponding to a 1 dB optical attenuation range, and each 1 dB flat-top corresponds to a wavelength range greater than 12 nanometers.

According to one embodiment of the disclosure, the wavelength range corresponding to the 1 dB flat-top in the spectrum of the incident optical signal of each of the wavelength division multiplexing units partially overlaps with the wavelength range corresponding to the 1 dB flat-top in the spectrum of the incident optical signal of another adjacent wavelength division multiplexing unit.

According to one embodiment of the disclosure, the wavelength division multiplexer includes n cascaded wavelength division multiplexing units; the wavelength division multiplexing unit has a combined structure made of a mode multiplexer and a multimode Bragg grating that are connected, or a backward Bragg grating directional coupler structure; the wavelength division multiplexing unit has a 1 dB flat-top range; when n+1 beams of an incident optical signal of wavelengths $\lambda 1$, $\lambda 2$ . . . $\lambda n+1$ are inputted to the on-chip integrated wavelength division multiplexer, the on-chip integrated wavelength division multiplexer combines the n+1 beams of the incident optical signal into one beam of light for output; among the n+1 beams of the incident optical signal, two beams of the incident optical signal having adjacent wavelengths have opposite polarization states; wavelengths of the n+1 beams of the incident optical signal are near center wavelengths of the 1 dB flat-top ranges of the wavelength division multiplexing units; wherein n is a natural number greater than 1. According to one embodiment of the disclosure, the 1 dB flat-top ranges of two wavelength division multiplexing units having adjacent center wavelengths partially overlap.

According to one embodiment of the disclosure, a width of the 1 dB flat-top range of the wavelength division multiplexing unit is 20-50 nm.

According to one embodiment of the disclosure, the center wavelengths of two wavelength division multiplexing units having adjacent center wavelengths are 15-25 nm apart.

According to one embodiment of the disclosure, the on-chip integrated wavelength division multiplexer further includes a polarization rotator; the polarization rotator is connected to the wavelength division multiplexing unit; the polarization rotator rotates a polarization state of a light inputted to the wavelength division multiplexing unit, so as to cause two beams of the incident optical signal having adjacent wavelengths among the n+1 beams of the incident optical signal inputted to the wavelength division multiplexing unit to have opposite polarization states.

According to one embodiment of the disclosure, some of the wavelength division multiplexing units in the on-chip integrated wavelength division multiplexer have a combined structure made of a mode multiplexer and a multimode Bragg grating that are connected, and some other wavelength division multiplexing units have a backward Bragg grating directional coupler structure.

According to one embodiment of the disclosure, the structure of each of the wavelength division multiplexing units is adapted to process an incident optical signal of a corresponding polarization state and a corresponding wavelength.

According to another aspect of the disclosure, a chip is provided, and the chip includes the on-chip integrated wavelength division multiplexer of any of the embodiments above.

Advantageous Effects

In the on-chip integrated wavelength division multiplexer and chip provided by embodiments of the present disclosure, the wavelength division multiplexer includes a bus waveguide and at least two cascaded wavelength division multiplexing units disposed on the bus waveguide. Each of the wavelength division multiplexing units includes two input ports and one output port, and is used for combining two optical signals received by the two input ports and outputting the combined optical signal from the output port, so as to implement multiplexing of incident optical signals of different wavelengths. By means of the structure in which the at least two wavelength division multiplexing units are cascaded, a relatively wide and flat-top passband can be provided for the on-chip integrated wavelength division multiplexer; moreover, the present disclosure has the characteristics of low loss and pure passivity, and can solve the problem of crosstalk between adjacent channels that may be caused by center wavelength shifting of wavelength division multiplexing devices.

BRIEF DESCRIPTION OF THE DRAWINGS

The following detailed description of specific embodiments of the disclosure, in conjunction with the drawings, will make the technical solutions and other advantageous effects of the present disclosure apparent.

DETAILED DESCRIPTION

Figure 1A:
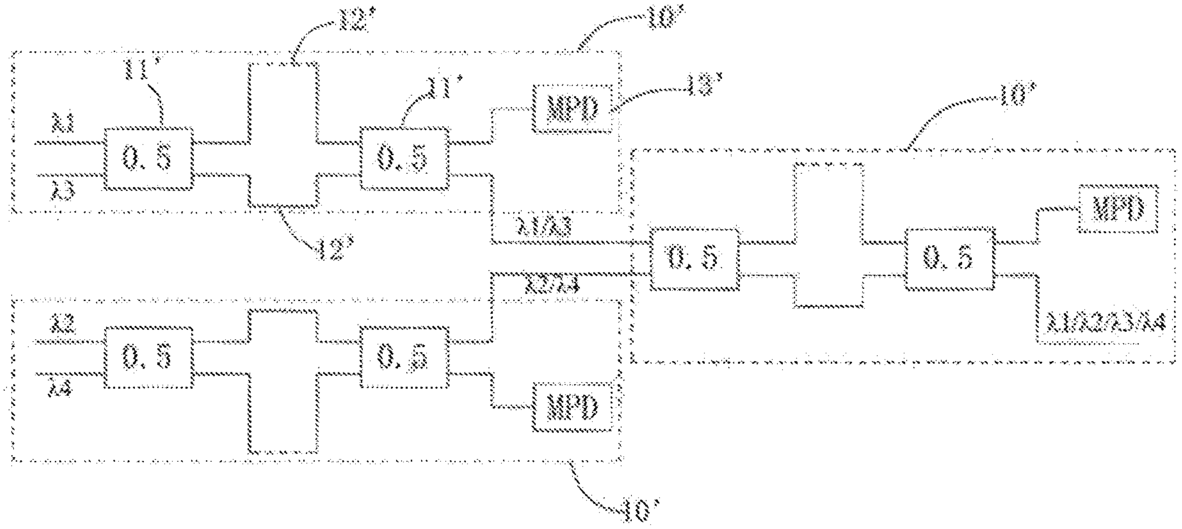
FIG. 1*a* is a structural diagram of a commonly used MZI on-chip integrated wavelength division multiplexer in a silicon photonic chip.
Figure 1B:
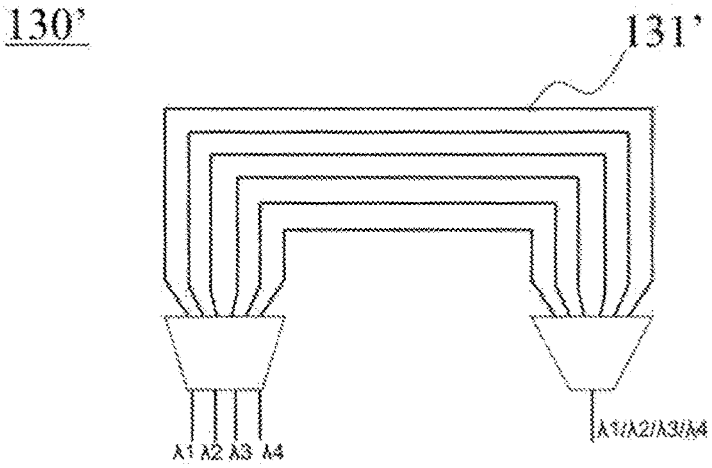
FIG. 1*b* is a structural diagram of a commonly used on-chip integrated wavelength division multiplexer having an arrayed waveguide grating structure in a silicon photonic chip.
Figure 1C:
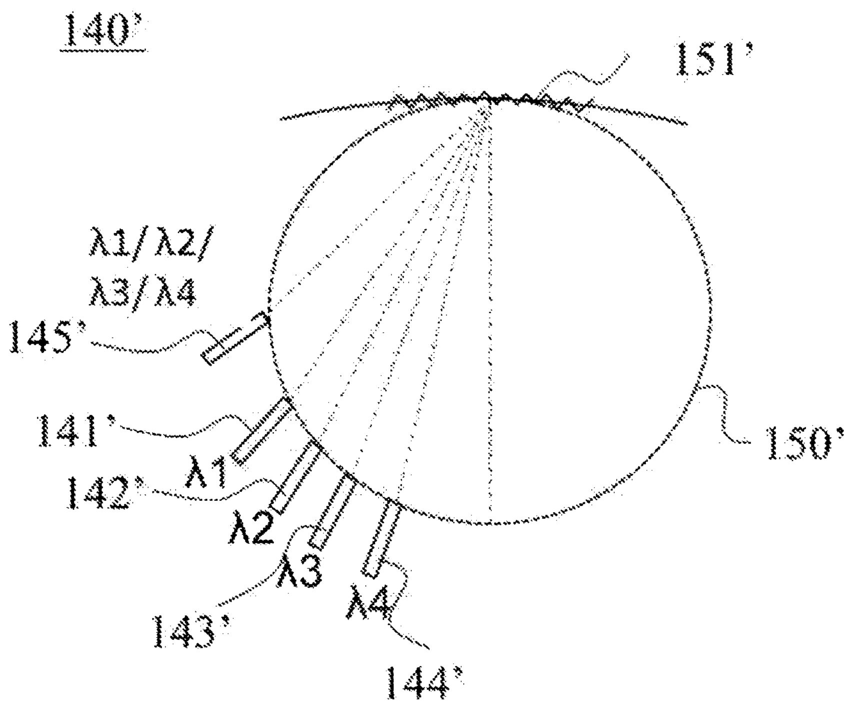
FIG. 1*c* is a structural diagram of a commonly used on-chip integrated wavelength division multiplexer having an etched diffraction grating structure in a silicon photonic chip.

A clear and complete description of technical solutions in embodiments of the present disclosure are provided below in conjunction with drawings in the embodiments of the present disclosure. Obviously, the described embodiments are only some and not all embodiments of the present disclosure. All other embodiments obtained by persons of skill in the art based on the embodiments in the present disclosure without creative labor fall within the scope of protection of the present disclosure.

The terms "first" and "second" herein are used for descriptive purposes only and cannot be construed as indicating or implying relative importance or implicitly specifying the quantity of the technical feature referred to. Therefore, a feature defined as "first" or "second" may include one or more of such feature, either explicitly or implicitly. In the description of the present disclosure, "plurality" means two or more, unless otherwise defined expressly and specifically.

In the description of the present disclosure, it needs to be noted that, unless otherwise expressly specified and defined, the terms "install," "connected," and "connect" are to be understood in a broad sense; for example, it may be a fixed connection, a detachable connection, or an integral connection; it may be a mechanical connection, an electrical connection, or in mutual communication; it may indicate a direct connection, an indirect connection through an intermediate medium, or an internal connect between two components or an interactive relationship between two components. To persons of ordinary skill in the art, the specific meaning of the above terms in the present disclosure may be understood in their specific context.

The following disclosure provides many different embodiments or examples for implementing various structures of the present disclosure. In order to simplify the disclosure of present disclosure, components and configurations of specific examples are described below. They are, of course, merely exemplary and are not intended to limit the present disclosure. Moreover, this disclosure may use the same reference numerals and/or reference letters in different examples, and such repetition is for the purpose of simplicity and clarity, and is not in itself indicative of a relationship between various embodiments and/or configurations being discussed.

Embodiment 1

Figure 2A:
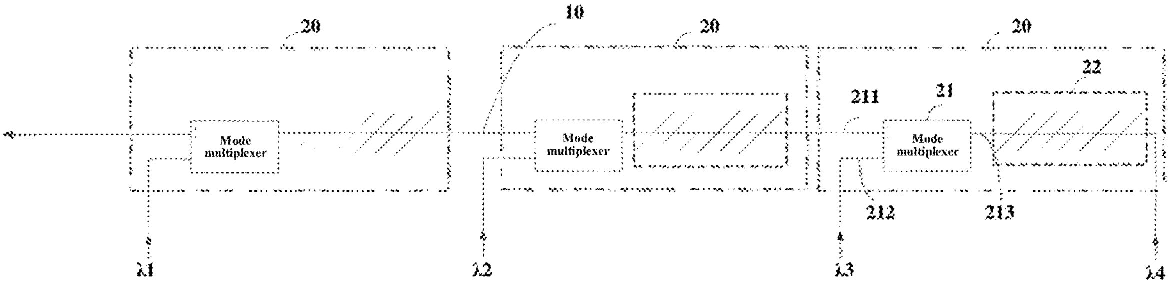
FIG. 2*a*-FIG. 2*b* are structural diagrams of a four-channel on-chip integrated wavelength division multiplexer provided in one embodiment of the present disclosure.
Figure 2B:
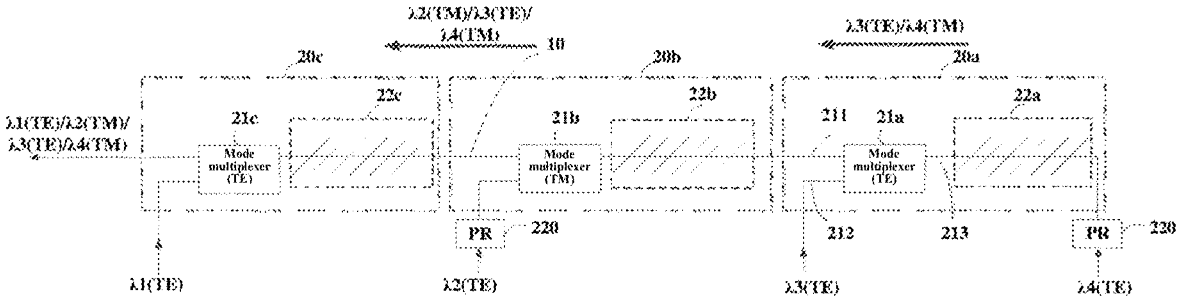
Figure 3:
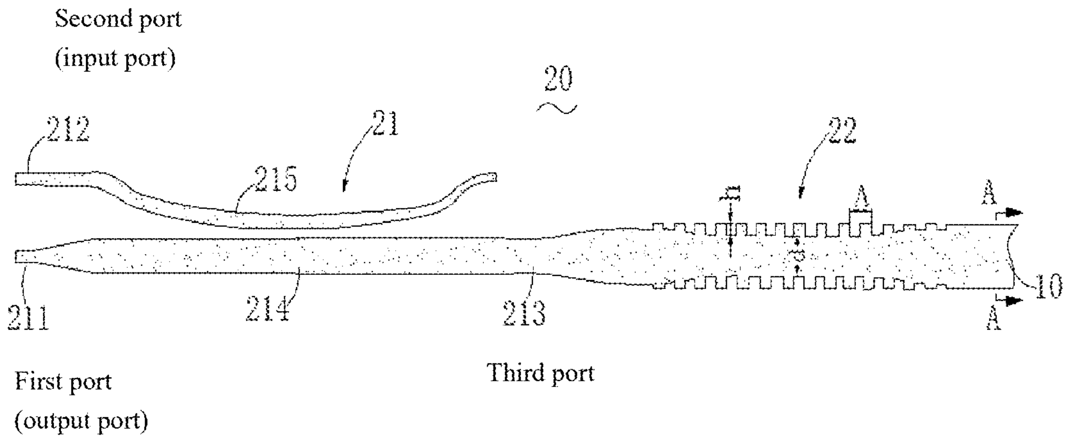
FIG. 3 is a structural diagram of a single wavelength division multiplexing unit in the on-chip integrated wavelength division multiplexer illustrated in FIG. 2*a*-FIG. 2*b;*
Figure 4:
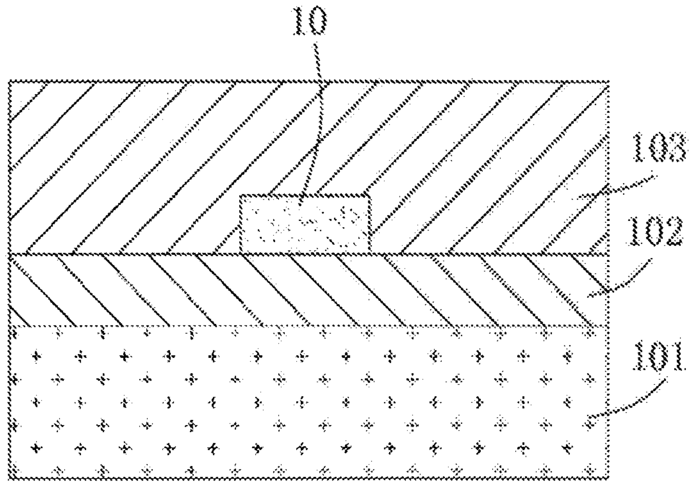
FIG. 4 is a structural diagram showing a cross-sectional view of a section A-A in FIG. 3.

FIG. 2*a*-FIG. 2*b* are structural diagrams of a four-channel on-chip integrated wavelength division multiplexer provided in one embodiment of the present disclosure. FIG. 3 is a structural diagram of a single wavelength division multiplexing unit in the on-chip integrated wavelength division multiplexer illustrated in FIG. 2*a*-2*b*. FIG. 4 is a structural diagram showing a cross-sectional view of a section A-A in FIG. 3.

Referring to FIGS. 2*a*-4, one embodiment of the present disclosure provides an on-chip integrated wavelength division multiplexer, including a substrate, a bus waveguide 10 disposed on the substrate, and at least two cascaded wavelength division multiplexing units 20 disposed on the bus waveguide 10. Each of the wavelength division multiplexing units 20 includes two input ports and one output port, and is used for combining two optical signals received by the two input ports and outputting a combined optical signal through the output port. Here, the two input ports of a first-level wavelength division multiplexing unit 20*a* are used for receiving incident optical signals having different polarization states, respectively, or, one of the two input ports of the first-level wavelength division multiplexing unit is used for receiving one beam of an incident optical signal having a polarization state, and the other input port is not used for receiving any incident optical signal. One of the two input ports of each non-first-level wavelength division multiplexing unit is used for receiving an incident optical signal, and the other is used for receiving a combined optical signal outputted from a previous-level wavelength division multiplexing unit; and incident optical signals received by two adjacent non-first-level wavelength division multiplexing units have different polarization states. Here, each of the incident optical signals has a different wavelength.

In the on-chip integrated wavelength division multiplexer provided in this embodiment of the present disclosure, the two input ports of the first-level wavelength division multiplexing unit are used for receiving incident optical signals having different polarization states, thus enabling the combining of incident optical signals having similar center wavelengths. And, one of the two input ports of each of the non-first-level wavelength division multiplexing unit is used for receiving an incident optical signal and the other is used for receiving a combined optical signal outputted from a previous-level wavelength division multiplexing unit, and incident optical signals received by two non-first-level wavelength division multiplexing units corresponding to adjacent input center wavelengths have different polarization states, so as to realize multiplexing of incident optical signals of different wavelengths. The on-chip integrated wavelength division multiplexer provided by this embodiment of the present disclosure can provide a relatively wide and flat-top passband for the on-chip integrated wavelength division multiplexer, and has characteristics such as low loss and pure passivity, and can solve the problem of crosstalk between adjacent channels that may be caused by center wavelength shifting of a wavelength division multiplexing device.

FIG. 3 is a structural diagram of the single wavelength division multiplexing unit 20. The substrate and covering layer structures are omitted in the figure, and only the bus waveguide and various component structures are shown. FIG. 4 is a structural diagram showing a cross-sectional view of the section A-A in FIG. 3. The wavelength division multiplexing unit 20 is formed on a planar waveguide of a silicon on insulator (SOI) structure, including a substrate 101, a buried oxide layer 102, the bus waveguide 10, and a covering layer 103. Here, the substrate 101 is a silicon substrate, the buried oxide layer 102 is silicon dioxide, the bus waveguide 10 is a strip waveguide made of silicon material, and the covering layer 103 is silicon dioxide. In other embodiments, the bus waveguide 10 may, alternatively, be a ridge waveguide or a waveguide made of another material, such as silicon nitride (SiN), silicon oxynitride (SiON), silicon oxide (SiO2), indium phosphide (InP), gallium nitride (GaN), or lithium niobate (LiNbO). The aforementioned on-chip integrated wavelength division multiplexer is a silicon-based wavelength division multiplexer, which includes a silicon substrate and at least two cascaded wavelength division multiplexing units 20 disposed on the silicon substrate. Alternatively, the wavelength division multiplexer may be disposed on a planar waveguide of another structure, and the substrate may alternatively be a substrate made of another material, such as a lithium niobate substrate, an indium phosphide substrate, or a gallium nitride substrate. The present disclosure does not impose any limitations here.

Illustratively, the wavelength division multiplexing unit 20 includes a mode multiplexer 21 and a multimode Bragg grating 22. If the polarization mode of an input light is a TE (transverse electric) mode, the mode multiplexer 21 is used for allowing the input light to enter the multimode Bragg grating 22 in a TE1 mode (transverse electric mode) or a higher-order mode. If the polarization mode of an input light is a TM (transverse magnetic) mode, the mode multiplexer 21 is used for allowing the input light to enter the multimode Bragg grating 22 in a TM1 mode (transverse magnetic mode) or a higher-order mode. Here, the mode multiplexer 21 includes a first port 211, a second port 212, and a third port 213. The first port 211 and the second port 212 are used for outputting a combined optical signal and receiving a corresponding incident optical signal, respectively, and the third port 213 is connected to an output port of the multimode Bragg grating 22 in the wavelength division multiplexing unit 20. In the aforementioned at least two cascaded wavelength division multiplexing units 20, the multimode Bragg gratings 22 of the different wavelength division multiplexing units 20 have different grating periods; therefore, in FIG. 2*b*, they are marked with the markings 22*a*, 22*b*, 22*c* . . . , respectively, in order to differentiate them. Similarly, the mode multiplexers 21 of the different wavelength division multiplexing units 20 are different; therefore, in FIG. 2*b*, they are marked with the markings 21*a*, 21*b*, 21*c* . . . , respectively, in order to differentiate them. Here, for each wavelength division multiplexing unit 20, a grating period of the multimode Bragg grating 22 matches a wavelength of an original incident optical signal of the wavelength division multiplexing unit 20. Specifically, the multimode Bragg grating 22 reflects a light of a certain wavelength $\lambda i=\Delta\lambda$ that satisfies the resonance condition with its grating period (Λ in FIG. 3 represents a period of a corresponding multimode Bragg grating), transmits lights of other remaining wavelengths, and converts the reflected light of the certain wavelength Δi into a lower-order mode for return to the mode multiplexer. That is, for each wavelength division multiplexing unit 20, the multimode Bragg grating 22 only reflects a light of a certain wavelength and certain polarization, and allows all lights of other remaining wavelengths except the certain wavelength to transmit through.

In this embodiment of the present disclosure, as shown in FIG. 3, the mode multiplexer 21 includes a straight-through waveguide 214 and a cross waveguide 215; two ends of the straight-through waveguide 214 serve as the first port 211 and the third port 213, respectively, and one end of the cross waveguide 215 near the first port 211 serves as the second port 212. The cross waveguide 215 and the straight-through waveguide 214 are used for mode coupling. In other embodiments, the mode multiplexer 21 may, alternatively, have another mode multiplexing structure. Illustratively, the mode multiplexer 21 is designed as follows: a light in a TE0 mode is inputted from the second port 212, transformed into a TE1 mode or higher-order mode by the mode multiplexer 21, and outputted from the third port 213 through the straight-through waveguide 214; the light in the TE1 mode or higher-order mode outputted from the third port 213 is reflected and transformed into the TE0 mode by its matching multimode Bragg grating, and directly outputted as a light in the TE0 mode from the straight-through waveguide 214 via the first port 211.

In this embodiment, the mode multiplexer 21 is an adiabatic coupler type mode multiplexer. In other embodiments, the mode multiplexer 21 may, alternatively, be a directional coupler type mode multiplexer, an asymmetric branch type mode multiplexer, or the like.

A grating pattern in the aforementioned multimode Bragg grating may be formed by, for example, deep etching into an edge of an optical waveguide to create a periodic grating pattern along the length of the waveguide. In some embodiments, the grating pattern is formed by a silicon nitride or silicon oxynitride material. For example, a silicon nitride or silicon oxynitride material may be deposited on a silicon oxide layer, and a dry etching technique is used to form the optical waveguide. Since the thermo-optic coefficient of silicon nitride or silicon oxynitride is smaller than that of single-crystal silicon, the multimode Bragg grating (as well as its associated wavelength division multiplexer device) is less sensitive to temperature changes during operation. In some cases, lower temperature sensitivity means that thermal tuning is not required for a wavelength division multiplexer device (or an optical apparatus) during operation. Implementation of the grating pattern may employ any possible means, such as using a buried grating layer to form one or more grating patterns. Moreover, if the multimode Bragg grating is sufficiently long (for example, implemented in an optical fiber), each grating may be spaced apart from each other.

Furthermore, continuing to refer to FIG. 2*b*, the wavelength division multiplexer further includes at least one polarization rotator (PR) 220; the polarization rotator 220 is used for receiving an original incident optical signal and changing a polarization state of the original incident optical signal; an output port of the polarization rotator 220 is optically coupled to one input port of the mode multiplexer 21 (e.g., the first port) to input the incident optical signal with changed polarization state to the first port of the mode multiplexer 21. Here, all original incident optical signals have the same polarization state. Here, for the first-level wavelength division multiplexing unit 20*a*, one of its two input ports of takes the optical signal whose polarization state has been changed from the original incident optical signal by a corresponding polarization rotator 220 as the incident optical signal, and the other input port directly takes the original incident optical signal as its incident optical signal; for two adjacent non-first-level wavelength division multiplexing units, one of them takes the optical signal whose polarization state has been changed from the original incident optical signal by a corresponding polarization rotator as the incident optical signal, and the other input port directly takes the original incident optical signal as its incident optical signal.

Figure 5:
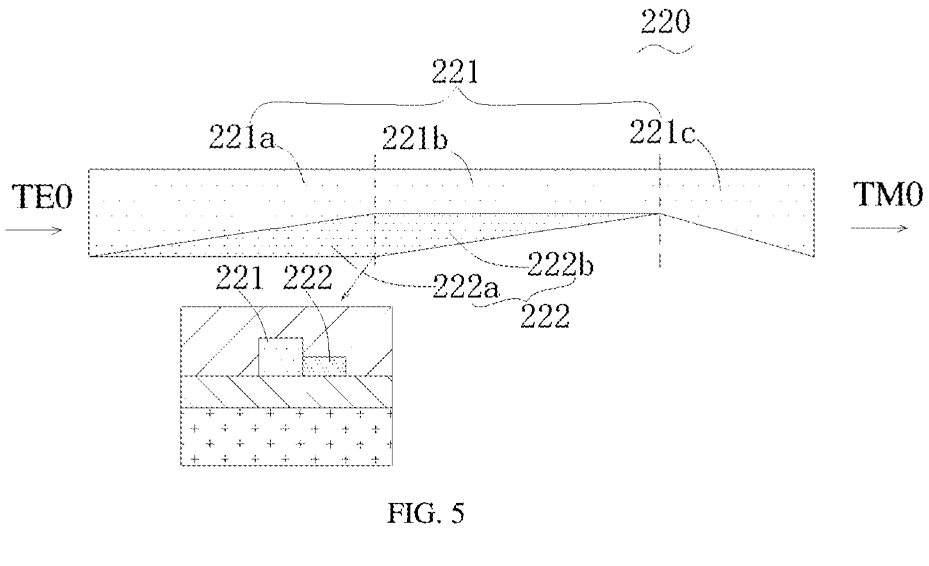
FIG. 5 is a structural diagram of a polarization rotator (PR) in the on-chip integrated wavelength division multiplexer illustrated in FIG. 2*a*-FIG. 2*b;*

FIG. 5 is a structural diagram of a polarization rotator (PR) in the on-chip integrated wavelength division multiplexer illustrated in FIG. 2*a*-FIG. 2*b*.

As shown in FIG. 5, in this embodiment, the polarization rotator 220 is used for changing an original polarization state of a received light beam to a polarization state perpendicular to the original polarization state. The polarization rotator (PR) 220 includes a ridge waveguide 221 and a partial planar waveguide 222 disposed on one side of the ridge waveguide 221. The ridge waveguide 221 includes a first wedge structure 221*a*, a linear structure 221*b*, and a second wedge structure 221*c*, connected in that sequence. The first wedge structure 221*a* serves as an input end of the polarization rotator 220; its width gradually narrows along an optical path until it is flush with and connected to the linear structure 221*b*. A width of the second wedge structure 221*c* gradually widens along the optical path until it is connected to an external optical waveguide. A height of the partial planar waveguide 222 is less than a height of the ridge waveguide 221. The partial planar waveguide 222 includes a third wedge structure 222*a* and a fourth wedge structure 222*b* that are located on a same side as the ridge waveguide 221 and connected to each other. The third wedge structure 222*a* is immediately adjacent to a side of the first wedge structure 221*a*, and the fourth wedge structure 222*b* is immediately adjacent to a side of the linear structure 221*b*. A tip end of the third wedge structure 222*a* abuts a side of a wider end of the first wedge structure 221*a*, and a tip end of the fourth wedge structure 222*b* is near a narrower end of the second wedge structure 221*c*. A linearly polarized light is incident on the wider end of the first wedge structure 221 of the ridge waveguide 221. In the first wedge structure 221*a* and the linear structure 221*b* section, the mode of the light disperses into the ridge waveguide 221 and the planar waveguide 222, causing its polarization state to rotate. When the light is incident on the second wedge structure 221*c*, the polarization state has already rotated 90 degrees, and then the light is coupled into the external optical waveguide through the second wedge structure 221*c*.

Illustratively, in the case of commonly used wavelength division multiplexing of four wavelengths included in the range of 1261 nm to 1341 nm required by CWDM4 in optical communication modules, assuming the four wavelengths are λ1, λ2, λ3, and λ4 (arranged in ascending order), at least three wavelength division multiplexing units need to be cascaded. As shown in FIGS. 2*b* and 3, the on-chip integrated wavelength division multiplexer in this embodiment includes a bus waveguide 10; a first-level wavelength division multiplexing unit 20*a*, a second-level wavelength division multiplexing unit 20*b*, and a third-level wavelength division multiplexing unit 20*c* that are cascaded and disposed on the bus waveguide 10; and two polarization rotation rotators 220. Each of the wavelength division multiplexing units 20 includes two input ports and one output port, and the wavelength division multiplexing unit 20 is used for combining two optical signals received by the two input ports and outputting the combined optical signal through the output port, so as to implement multiplexing of incident optical signals of different wavelengths. Here, the individual wavelength division multiplexing units 20*a*, 20*b*, and 20*c* include the mode multiplexers 21 and the multimode Bragg gratings 22*a*, 22*b*, 22*c*. The three wavelength division multiplexing units correspond to a first multimode Bragg grating 22*a*, a second multimode Bragg grating 22*b*, and a third multimode Bragg grating 22*c*, respectively. Each of the multimode Bragg gratings of the three wavelength division multiplexing units 20*a*, 20*b*, 20*c* has a different grating period for respectively reflecting light of wavelengths λ3, λ2, and λ1 and transmitting other remaining wavelengths. For example, the first multimode Bragg grating 22*a* transmits a light of λ4, the second multimode Bragg grating 22*b* transmits a combined optical signal of λ3/λ4, and the third multimode Bragg grating 22*c* transmits a combined optical signal of wavelengths such as λ2/λ3/λ4.

Each of the mode multiplexers 21 in the aforementioned three wavelength division multiplexing units includes the first port 211, the second port 212, and the third port 213. The first port 211 and the second port 212 are used for outputting a combined optical signal and receiving a corresponding incident optical signal, respectively, and the third port 213 is connected to the output port of the corresponding multimode Bragg grating in the wavelength division multiplexing unit. If the wavelength division multiplexing unit is a non-first-level wavelength division multiplexing unit, then one end of the multimode Bragg grating in the wavelength division multiplexing unit is used for receiving a combined optical signal outputted from a previous-level wavelength division multiplexing unit, and another end is connected to the third port of the mode multiplexer in the wavelength division multiplexing unit. If the wavelength division multiplexing unit is a first-level wavelength division multiplexing unit, then one end of the multimode Bragg grating in the wavelength division multiplexing unit is used for receiving a corresponding incident optical signal, and another end is connected to the third port 213 of the mode multiplexer in the wavelength division multiplexing unit.

In FIG. 2*b*, there is a predetermined wavelength spacing between each of the incident optical signals. Starting from the first level of the cascaded wavelength division multiplexing units, the three wavelengths λ2, λ3, and λ4 of the four wavelengths λ1, λ2, λ3, and λ4 (arranged in ascending order) are respectively inputted in reverse order to the second ports 212 of the three mode multiplexers 21 in the three wavelength division multiplexing units 20*a*, 20*b*, and 20*c*. Specifically, the first multimode Bragg grating 22*a* receives the incident optical signal of wavelength λ3 via the third port 213 of a first mode multiplexer 21*a*; the first multimode Bragg grating 22*a* is used for reflecting the incident optical signal of wavelength λ3, transmitting optical signals of other remaining wavelengths, and reflecting the incident optical signal of wavelength λ3 back to the mode multiplexer 21. The second multimode Bragg grating 22*b* receives the incident optical signal of wavelength λ2 via the third port 213 of a second mode multiplexer 21*b*; the second multimode Bragg grating 22*b* is used for reflecting the incident optical signal of wavelength λ2, transmitting optical signals of other remaining wavelengths, and reflecting the incident optical signal of wavelength λ2 back to the mode multiplexer 21. The third multimode Bragg grating 22*c* receives the incident optical signal of wavelength λ1 via the third port 213 of a third mode multiplexer 21*c*; the third multimode Bragg grating 22*c* is used for reflecting the incident optical signal of wavelength λ1, transmitting optical signals of other remaining wavelengths, and reflecting the incident optical signal of wavelength λ1 back to the mode multiplexer 21. Here, the mode multiplexer 21 is, for example, designed as follows: a light in a TE0 mode is received from the second port 212, transformed into a TE1 mode or higher-order mode by the mode multiplexer 21, and outputted from the third port 213 through the straight-through waveguide; the light in the TE1 mode or higher-order mode outputted from the third port 213 is reflected and transformed into the TE0 mode by its matching multimode Bragg grating, and directly outputted in the TE0 mode from the straight-through waveguide 214 via the first port 211.

During operation, a light of wavelength λ1 (TE0) is inputted to the second port 212 of the mode multiplexer 21 of the third-level wavelength division multiplexing unit 20*c*. It is then transformed into λ1 in the TE1 mode or higher-order mode by the mode multiplexer 21, which works in TE mode. λ1 in the TE1 mode or higher-order mode is reflected and transformed into λ1 in the TE0 mode after passing through the third multimode Bragg grating 22*c*, and the reflected light of wavelength λ1 in the TE0 mode is outputted from the third port 213 of the TE mode multiplexer 21.

During operation, a light of wavelength λ2 (TE0) is inputted to the polarization rotator (PR), transformed to λ2 (TM0), and then inputted to the second port 212 of the mode multiplexer 21 of the second-level wavelength division multiplexing unit 20*b*. It is transformed into λ2 in a TM1 mode or higher-order mode by the second mode multiplexer 21*b*, which works in TM mode. λ2 in the TM1 mode or higher-order mode is reflected and transformed into λ2 in the TM0 mode after passing through the second multimode Bragg grating 22*b*, and the reflected light of wavelength λ2 in the TM0 mode is outputted from the third port 213 of the TE mode multiplexer 21. Subsequently, the light is outputted from the output port of the second-level wavelength division multiplexing unit 20*b*, remains the same as it passes through the third-level wavelength division multiplexing unit 20*c*, and is outputted from the output port of the third-level wavelength division multiplexing unit 20*c*.

A light of wavelength λ3 (TE0) is inputted to the second port 212 of the mode multiplexer 21 of the first-level wavelength division multiplexing unit 20*a*. It is then transformed into λ3 in a TE1 mode or higher-order mode by the first mode multiplexer 21*a*, which works in TE mode. λ3 in the TE1 mode or higher-order mode is reflected and transformed into λ3 in the TE0 mode after passing through the first multimode Bragg grating 22*a*, and the reflected light of wavelength λ3 in the TE0 mode is outputted from the third port 213 of the TE mode multiplexer 21. Subsequently, the light is outputted from the output port of the first-level wavelength division multiplexing unit 20*a*, remains the same after it passes through the second-level wavelength division multiplexing unit 20*b* and the third-level wavelength division multiplexing unit 20*c*, and is outputted from the output port of the third-level wavelength division multiplexing unit 20*c*.

A light of wavelength λ4 (TE0) is inputted to the polarization rotator (PR) and transformed into λ4 (TM0). It remains the same after passing through the first multimode Bragg grating 22*a*. It remains the same after passing through and being outputted from the third port of the mode multiplexer 21 of the first-level wavelength division multiplexing unit 20*a*. It still remains the same as it passes through the second-level wavelength division multiplexing unit 20*b* and the third-level wavelength division multiplexing unit 20*c*. Finally, it is outputted from one output port of the third-level wavelength division multiplexing unit 20*c*.

It needs to be noted that in this embodiment, for each wavelength division multiplexing unit, the design aims to minimize loss at a center wavelength of λ0 (the center wavelength is the wavelength of a light that is expected to pass through when the center wavelength is designed), and to ensure that losses in a center wavelength range of λ0+Δλ (where Δλ is a passband bandwidth required of the on-chip integrated wavelength division multiplexing device by a system) is less than 1 dB in comparison with losses at the center wavelength. Here, λ0+Δλ is referred to as a 1 dB flat-top range of the wavelength division multiplexing unit. Here, each of the 1 dB flat-top ranges corresponds to a wavelength range within a 1 dB optical attenuation range, and each 1 dB flat-top corresponds to a wavelength range greater than 12 nanometers. Furthermore, wavelength ranges corresponding to two 1 dB flat-tops of two beams of incident optical signal inputted in different wavelength division multiplexing units are spaced apart by a certain distance. In order to effectively separate two beams of incident optical signal having adjacent center wavelengths, the two beams of incident optical signal having adjacent center wavelengths may be made to have different polarization states, thus achieving the combining and multiplexing of two beams of incident optical signal having adjacent center wavelengths. And, the wavelength range corresponding to the 1 dB flat-top in a spectrum of the incident optical signal of each wavelength division multiplexing unit partially overlaps with the wavelength range corresponding to the 1 dB flat-top in a spectrum of the incident optical signal of another adjacent wavelength division multiplexing unit. At the output end of the wavelength division multiplexer in this embodiment of the present disclosure, a difference between the center wavelengths of two incident optical signals having adjacent wavelengths in a same polarization state is greater than a preset wavelength difference threshold, and the wavelength difference threshold is greater than the wavelength range corresponding to the 1 dB flat-top. For example, the difference between the center wavelengths of two incident optical signals having adjacent wavelengths in a same polarization state is greater than 20 nm, so as to avoid the problem of crosstalk between two beams of incident optical signal having adjacent center wavelengths. Preferably, a width of the 1 dB flat-top range of the wavelength division multiplexing unit is 20-50 nm. Preferably, the center wavelengths of two wavelength division multiplexing units having adjacent center wavelengths are 15-25 nm apart.

Figure 8:
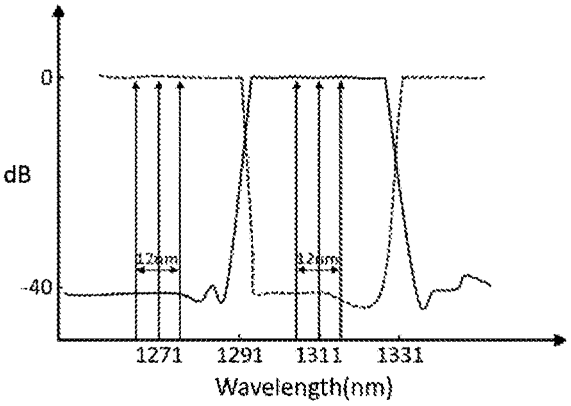
FIG. 8 is a filtered spectrogram of a beam of original incident optical signal having a center wavelength near 1311 nm for a single wavelength division multiplexing unit in this embodiment of the present disclosure.
Figure 9:
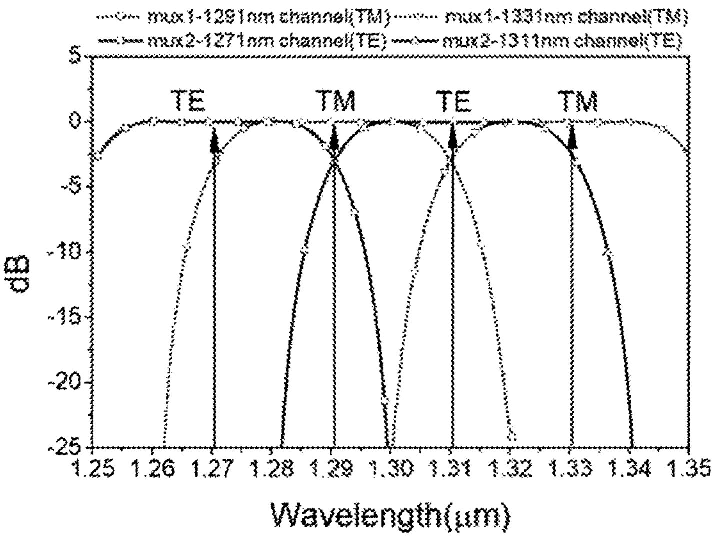
FIG. 9 is an overall simulation spectrogram of a four-channel on-chip integrated wavelength division multiplexer in one embodiment of the present disclosure.

FIG. 8 is a filtered spectrogram of a beam of original incident optical signal having a center wavelength near 1311 nm for a single wavelength division multiplexing unit in this embodiment of the present disclosure. FIG. 9 is an overall simulation spectrogram of a four-channel on-chip integrated wavelength division multiplexer in one embodiment of the present disclosure.

Illustratively, as shown in FIGS. 8 and 9, FIG. 8 may represent a spectrogram of one flat-top structure in one of the wavelength division multiplexing units. It can be seen from the figure that this wavelength division multiplexing unit has at least one 1 dB flat-top in it (a flat portion along a horizontal axis in the figure). Illustratively, a center wavelength of wavelengths corresponding to the one 1 dB flat-top displayed in FIG. 8 is 1311 nm. A wavelength range corresponding to the 1 dB flat-top is approximately 40 nm (a width of the flat portion in the figure). Therefore, the wavelength division multiplexing unit can tolerate the impacts of factors such as width, height, and angle of inclination of the waveguide, as well as temperature changes, on the shifting of the center wavelength, which reduces sensitivity of the wavelength division multiplexing unit to the width, height, or angle of inclination of the waveguide.

As shown in FIG. 9, the 1 dB flat-top ranges corresponding to center wavelengths 1271 nm and 1291 nm partially overlap, the 1 dB flat-top ranges corresponding to center wavelengths 1291 nm and 1311 nm partially overlap, and the 1 dB flat-top ranges corresponding to center wavelengths 1311 nm and 1331 nm partially overlap. However, since these center wavelengths are cross-distributed in different wavelength division multiplexing units, and incident lights inputted to the input ports of two adjacent non-first-level wavelength division multiplexing units have different polarization states, the wavelength ranges corresponding to the 1 dB flat-top ranges of these center wavelengths can be staggered, thereby enabling a function of wave combining. Additionally, for the two input ports of the first-level wavelength division multiplexing unit, incident optical signals having different polarization states are inputted, and wavelengths of the two incident optical signals can be spaced apart by a predetermined distance to improve the combining effect and absorption tolerance. For example, the predetermined distance of the spacing may be less than 5 nanometers. It needs to be noted that in this embodiment, the spacing between two adjacent 1 dB flat-tops of different wavelength division multiplexing units refers to a distance between edges of the two 1 dB flat-tops, and not to a distance between centers of the two 1 dB flat-tops.

Embodiment 2

Figure 2C:
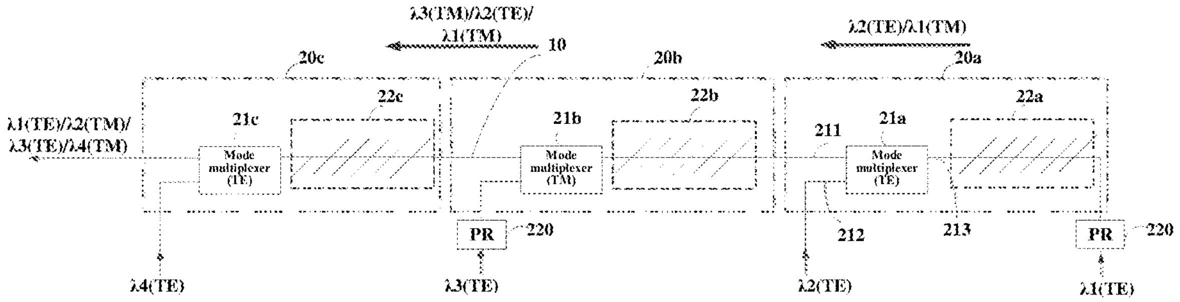
FIG. 2*c* is a structural diagram of a four-channel on-chip integrated wavelength division multiplexer provided in another embodiment of the present disclosure.

FIG. 2*c* is a structural diagram of a four-channel on-chip integrated wavelength division multiplexer provided in another embodiment of the present disclosure.

As shown in FIG. 2*c*, unlike FIG. 2*b*, starting from the first level of the cascaded wavelength division multiplexing units, the three wavelengths λ2, λ3, and λ4 of the four wavelengths λ1, λ2, λ3, and λ4 (arranged in ascending order) are respectively inputted in forward order to the second ports 212 of the three mode multiplexers 21 in the three wavelength division multiplexing units 20*a*, 20*b*, and 20*c*.

Specifically, the first multimode Bragg grating 22*a* receives the incident optical signal of wavelength λ2 via the third port 213 of the first mode multiplexer 21*a*. The first multimode Bragg grating 22*a* is used for reflecting the incident optical signal of wavelength λ2, transmitting optical signals of other remaining wavelengths, and reflecting the incident optical signal of wavelength λ2 back to the first mode multiplexer 21*a*. The second multimode Bragg grating 22*b* receives the incident optical signal of wavelength λ3 via the third port 213 of a second mode multiplexer 21*b*. The second multimode Bragg grating 22*b* is used for reflecting the incident optical signal of wavelength λ3, transmitting optical signals of other remaining wavelengths, and reflecting the incident optical signal of wavelength λ3 back to the second mode multiplexer 21*b*. The third multimode Bragg grating 22*c* receives the incident optical signal of wavelength λ4 via the third port 213 of a third mode multiplexer 31*c*. The third multimode Bragg grating 22*c* is used for reflecting the incident optical signal of wavelength λ4, transmitting optical signals of other remaining wavelengths, and reflecting the incident optical signal of wavelength λ4 back to the third mode multiplexer 21*c*. Here, the mode multiplexers 21*a* and 21*c* are, for example, designed as follows: lights in a TE0 mode are inputted from the second ports 212, transformed into a TE1 mode or higher-order mode by the mode multiplexers 21*a* and 21*c*, and outputted from the third ports through the straight-through waveguides. The lights in the TE1 mode or higher-order mode outputted from the third ports 213 are reflected and transformed into the TE0 mode by their matching multimode Bragg gratings, and directly outputted as lights in the TE0 mode from the straight-through waveguides 214 via the first ports 211.

It should be understood that there is a predetermined wavelength spacing between each of the incident optical signals, the inputted incident optical signals at two input ports of the first-level wavelength division multiplexing unit have different polarization states, and incident optical signals received by two non-first-level wavelength division multiplexing units corresponding to adjacent input center wavelengths have different polarization states. Therefore, so long as these three conditions are satisfied, it is not strictly required that a corresponding input port of the wavelength division multiplexing unit of each level receive the corresponding incident optical signal in forward or reverse order of the magnitude of its wavelength starting from the first level of the cascaded wavelength division multiplexing units. Alternatively, the corresponding input port of the wavelength division multiplexing unit of each level may receive the incident optical signal in a different order starting from the first level of the cascaded wavelength division multiplexing units.

Embodiment 3

Figure 6:
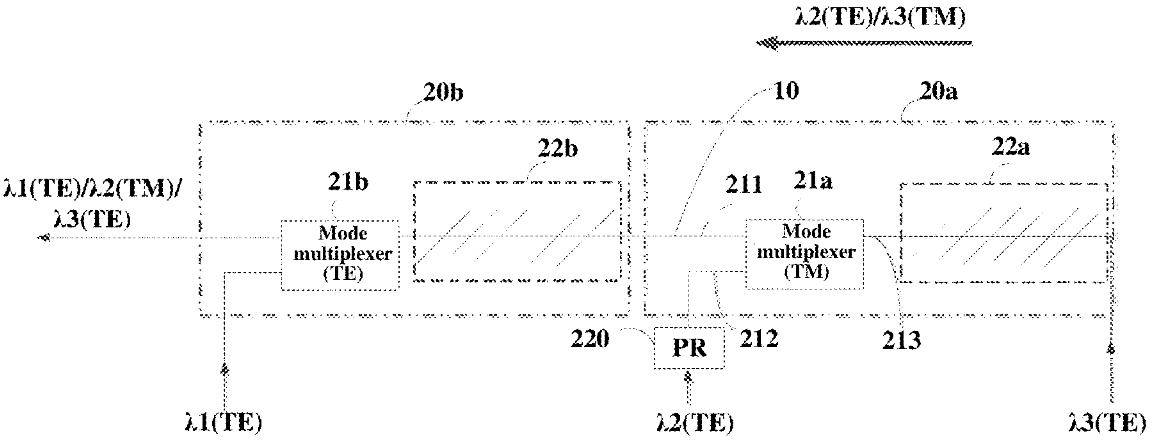
FIG. 6 is a structural diagram of a three-channel on-chip integrated wavelength division multiplexer provided in another embodiment of the present disclosure.

FIG. 6 is a structural diagram of a three-channel on-chip integrated wavelength division multiplexer provided in another embodiment of the present disclosure.

As shown in FIG. 6, the difference between FIG. 6 and FIG. 2*b* is only that FIG. 6 implements the multiplexing of three wavelengths of λ1, λ2, and λ3 (wavelengths in ascending order). Therefore, two wavelength division multiplexing units need to be cascaded in FIG. 6. Specifically, one embodiment of the three-channel on-chip integrated wavelength division multiplexer includes a first-level wavelength division multiplexing unit 20*a* and a second-level wavelength division multiplexing unit 20*b* that are cascaded, and one polarization rotator 220. The rest of the implementation is similar to that of FIG. 2*b* and will not be repeated here.

Embodiment 4

Figure 7:
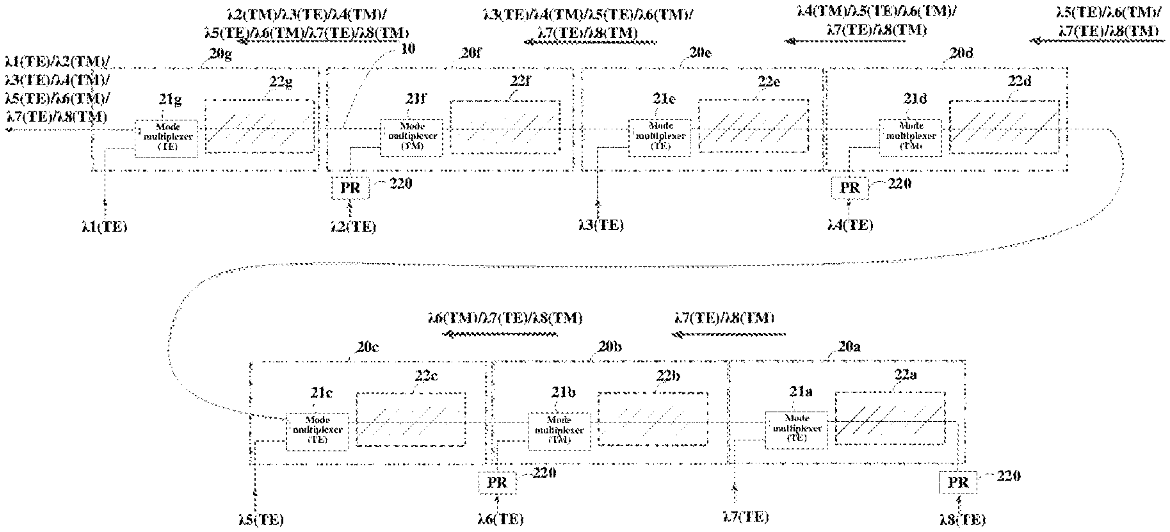
FIG. 7 is a structural diagram of an eight-channel on-chip integrated wavelength division multiplexer provided in another embodiment of the present disclosure.

FIG. 7 is a structural diagram of an eight-channel on-chip integrated wavelength division multiplexer provided in another embodiment of the present disclosure.

As shown in FIG. 7, the difference between FIG. 7 and FIG. 2*b* is only that FIG. 7 implements the multiplexing of eight wavelengths of λ1, λ2, λ3, λ4, λ5, λ6, λ7, and λ8 (wavelengths in ascending order); therefore, seven wavelength division multiplexing units need to be cascaded in FIG. 7. Specifically, one embodiment of the eight-channel on-chip integrated wavelength division multiplexer includes a first-level wavelength division multiplexing unit 20*a*, a second-level wavelength division multiplexing unit 20*b*, a third-level wavelength division multiplexing unit 20*c*, a fourth-level wavelength division multiplexing unit 20*d*, a fifth-level wavelength division multiplexing unit 20*e*, a sixth-level wavelength division multiplexing unit 20*f*, and a seventh-level wavelength division multiplexing unit 20*g* that are cascaded; and four polarization rotators 220. It should be understood that if more wavelengths are to be multiplexed, it can be achieved by increasing the quantity of cascaded wavelength division multiplexing unit accordingly on the basis of FIG. 7. Further details will not be repeated here.

The wavelength division multiplexing unit used above has a combined structure made of a mode multiplexer and a multimode Bragg grating, the use of a structure having at least two cascaded wavelength division multiplexing units can provide a relatively wide and flat-top passband for the on-chip integrated wavelength division multiplexer, and the use of a multimode Bragg grating based on silicon nitride or silicon oxide can eliminate the need for temperature control and thus reduce the power consumption of the wavelength division multiplexer. In addition, the multimode Bragg grating can achieve very low insertion loss, allowing the wavelength division multiplexer to also have relatively low insertion loss, e.g., less than 1 to 2 decibels (dB). Moreover, the multimode Bragg grating can have a wider passband and a larger manufacturing tolerance.

Embodiment 5

Figure 10:
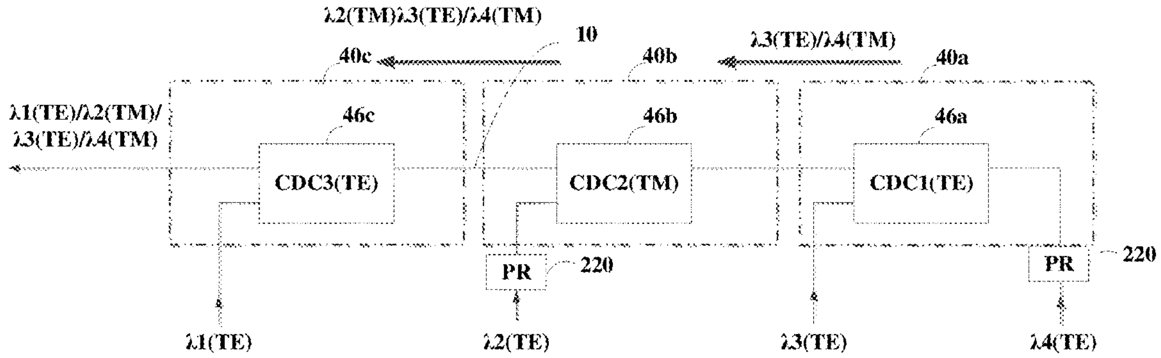
FIG. 10 is a structural diagram of a four-channel on-chip integrated wavelength division multiplexer provided in yet another embodiment of the present disclosure.
Figure 11:
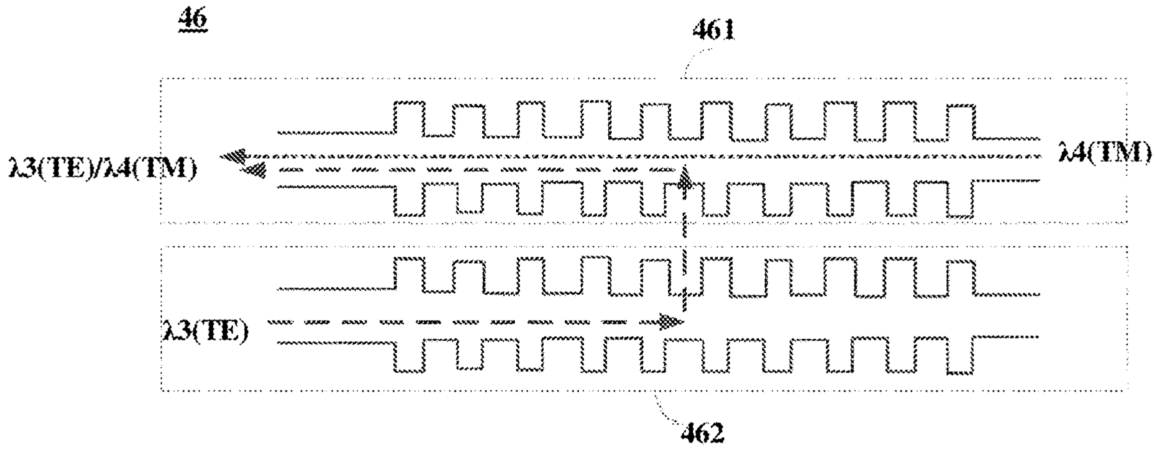
FIG. 11 is a structural diagram of a backward Bragg grating directional coupler in the on-chip integrated wavelength division multiplexer illustrated in FIG. 10.

FIG. 10 is a structural diagram of a four-channel on-chip integrated wavelength division multiplexer provided in yet another embodiment of the present disclosure. FIG. 11 is a structural diagram of a backward Bragg grating directional coupler in the on-chip integrated wavelength division multiplexer illustrated in FIG. 10.

Illustratively, in the case of commonly used wavelength division multiplexing of four wavelengths included in the range of 1261 nm to 1341 nm required by CWDM4 in optical communication modules, assuming the four wavelengths are λ1, λ2, λ3, and λ4 (arranged in ascending order), at least three wavelength division multiplexing units need to be cascaded. As shown in FIGS. 10 and 11, the on-chip integrated wavelength division multiplexer in this embodiment includes a bus waveguide 10; a first-level wavelength division multiplexing unit 40*a*, a second-level wavelength division multiplexing unit 40*b*, and a third-level wavelength division multiplexing unit 40*c* that are cascaded and disposed on the bus waveguide 10; and two polarization rotators 220. Each of the wavelength division multiplexing units 40*a*, 40*b*, and 40*c* includes two input ports and one output port, and is used for combining two optical signals received by the two input ports and outputting a combined optical signal from the output port, so as to implement multiplexing of incident optical signals of different wavelengths. Here, the individual wavelength division multiplexing units 40*a*, 40*b*, and 40*c* include backward Bragg grating directional coupler structures 46*a*, 46*b*, and 46*c*, respectively. Each of the backward Bragg grating directional couplers 46*a*, 46*b*, and 46*c* in the wavelength division multiplexing units includes a fourth port, a fifth port, and a sixth port, and the fourth port and the fifth port are used for receiving the corresponding incident optical signal and for outputting a combined optical signal, respectively. If the wavelength division multiplexing unit is a non-first-level wavelength division multiplexing unit, then the sixth port of the backward Bragg grating directional coupler in the wavelength division multiplexing unit is used for receiving a combined optical signal outputted from a previous-level wavelength division multiplexing unit. If the wavelength division multiplexing unit is the first-level wavelength division multiplexing unit, then the sixth port of the backward Bragg grating directional coupler in the wavelength division multiplexing unit is used for receiving a corresponding incident optical signal.

Specifically, each of the backward Bragg grating directional coupler structures 46*a*, 46*b*, and 46*c* includes a first backward Bragg grating directional coupling structure 461 and a second backward Bragg grating directional coupling structure 462. Here, the two input ports of the first-level wavelength division multiplexing unit 40*a* are used for receiving incident optical signals having different polarization states, respectively. One of the two input ports of each of the non-first-level wavelength division multiplexing units 40*b* and 40*c* is used for receiving an incident optical signal, and the other is used for receiving a combined optical signal outputted from a previous-level wavelength division multiplexing unit; and incident optical signals received by two adjacent non-first-level wavelength division multiplexing units have different polarization states. Here, each of the incident optical signals has a different wavelength (λ1, λ2, λ3, and λ4 having a predetermined wavelength spacing).

As shown in FIG. 11, illustratively, during operation, the incident optical signals λ3 (e.g., in a TE mode) and 24 (e.g., its original incident optical signal in TE mode, and then transformed into a TM mode after passing through a polarization rotator 220) are inputted to the two input ports of the first-level wavelength division multiplexing unit 40*a*, respectively. Here, the optical signal of wavelength λ4 (TM mode) is inputted through a backward port of the first backward Bragg grating directional coupling structure 461 in the first-level wavelength division multiplexing unit 40*a*, and the optical signal of wavelength λ3 (TE mode) is inputted through a forward port of the second backward Bragg grating directional coupling structure 462 in this first-level wavelength division multiplexing unit 40*a*. The optical signal of wavelength λ4 (TM mode) is inputted through the backward port of the first backward Bragg grating directional coupling structure 461. Therefore, the first backward Bragg grating directional coupling structure 461 does not act on the optical signal of wavelength λ4 (TM mode), and the optical signal of wavelength λ4 directly exit from a forward port of the first backward Bragg grating directional coupling structure 461. The optical signal of wavelength λ3 (TE mode) is inputted through the forward port of the second backward Bragg grating directional coupling structure 462. Therefore, the second backward Bragg grating directional coupling structure 462 acts on the optical signal of wavelength λ3 (TE mode), and the optical signal of wavelength λ3 is inputted from the forward port of the second backward Bragg grating directional coupling structure 462, travels into the first backward Bragg grating directional coupling structure 461 by way of a location near a center of the second backward Bragg grating directional coupling structure 462, and is then outputted from the forward port of the first backward Bragg grating directional coupling structure 461. This causes the two incident optical signals λ3 (TE mode) and λ4 (TM mode) to have a certain optical path difference; finally, the optical signal of wavelength λ4 (TM mode) and the optical signal of wavelength λ3 (TE mode) outputted from the forward port of the first backward Bragg grating directional coupling structure 461 converge and couple, creating a combined optical signal λ3 (TE)/λ4 (TM).

One input port of the two input ports of the second-level wavelength division multiplexing unit 40*b* receives the incident optical signal, and the other input port inputs the combined optical signal of the previous-level wavelength division multiplexing unit (the first-level wavelength division multiplexing unit 40*a*). Therefore, in the same manner as described above, during operation, the incident optical signal λ2 (TE mode) is inputted to the polarization rotator 220 and then transformed into a TM mode. Next, the incident optical signal λ2 (TM mode) is inputted at the forward port of the second backward Bragg grating directional coupling structure 462 in the second-level wavelength division multiplexing unit 40*b*. The optical signal of wavelength λ2 (TM mode) is inputted from the forward port of the second backward Bragg grating directional coupling structure 462, travels into the first backward Bragg grating directional coupling structure 461 by way of a location near a center of the second backward Bragg grating directional coupling structure 462, and is then outputted from the forward port of the first backward Bragg grating directional coupling structure 461. The combined optical signal λ3 (TE)/λ4 (TM) outputted through the first-level wavelength division multiplexing unit 40*a* is inputted at the forward port of the first backward Bragg grating directional coupling structure 461 in the second-level wavelength division multiplexing unit 40*b*. Finally, they converge and couple at the forward port of the first backward Bragg grating directional coupling structure 461 of the second-level wavelength division multiplexing unit 40*b*, creating a combined optical signal λ2 (TM)/λ3 (TE)/λ4 (TM), so as to output the combined optical signal λ2 (TM)/λ3 (TE)/λ4 (TM) to a next-level wavelength division multiplexing unit.

One input port of the two input ports of the third-level wavelength division multiplexing unit 40*c* receives the incident optical signal, and the other input port inputs the combined optical signal of the previous-level wavelength division multiplexing unit (the second-level wavelength division multiplexing unit 40*b*). Therefore, in the same manner as described above, during operation, the incident optical signal λ1 (TE mode) is inputted at the forward port of the second backward Bragg grating directional coupling structure 462 in the third-level wavelength division multiplexing unit 40*c*. The optical signal of wavelength λ1 (TE mode) is inputted from the forward port of the second backward Bragg grating directional coupling structure 462, travels into the first backward Bragg grating directional coupling structure 461 by way of a location near a center of the second backward Bragg grating directional coupling structure 462, and is then outputted from the forward port of the first backward Bragg grating directional coupling structure 461. The combined optical signal λ2 (TM)/λ3 (TE)/λ4 (TM) outputted through the second-level wavelength division multiplexing unit 40*b* is inputted at the forward port of the first backward Bragg grating directional coupling structure 461 in the third-level wavelength division multiplexing unit 40*c*. Finally, they converge and couple at the forward port of the first backward Bragg grating directional coupling structure 461 of the third-level wavelength division multiplexing unit 40*c*, creating a combined optical signal λ1 (TE)/λ2 (TM)/λ3 (TE)/λ4 (TM).

The at least two cascaded wavelength division multiplexing units above are made of backward Bragg grating directional coupling structures, the use of a structure having at least two cascaded wavelength division multiplexing units can provide a relatively wide and flat-top passband for the on-chip integrated wavelength division multiplexer, and, moreover, the use of backward Bragg gratings based on silicon nitride or silicon oxide can eliminate laser source temperature control and/or reduce the power consumption of the wavelength division multiplexer.

In FIG. 10, there is a predetermined wavelength spacing between each of the incident optical signals, and the corresponding input port of the wavelength division multiplexing unit of each level receives the corresponding incident optical signal in reverse order of the magnitude of its wavelength starting from the first level of the cascaded wavelength division multiplexing units. In other embodiments, alternatively, the corresponding input port of the wavelength division multiplexing unit of each level may receive the corresponding incident optical signals in an order of the magnitude of its wavelength starting from the first level of the cascaded wavelength division multiplexing units; further details will not be repeated here. And, it should be understood that there is a predetermined wavelength spacing between each of the incident optical signals, the inputted incident optical signals at two input ports of the first-level wavelength division multiplexing unit have different polarization states, and incident optical signals received by two non-first-level wavelength division multiplexing units corresponding to adjacent input center wavelengths have different polarization states. Therefore, so long as these three conditions are satisfied, it is not strictly required that the corresponding input port of the wavelength division multiplexing unit of each level receive the corresponding incident optical signal in forward or reverse order of the magnitude of its wavelength starting from the first level of the cascaded wavelength division multiplexing units. Alternatively, the corresponding input port of the wavelength division multiplexing unit of each level may receive the incident optical signal in a different order starting from the first level of the cascaded wavelength division multiplexing units. The various embodiments described above are all within the embodiment spirit of the present disclosure.

The aforementioned wavelength division multiplexing unit having a backward Bragg grating directional coupler structure can also realize the combining of two incident optical signals whose center wavelengths are close to each other. And, one of the two input ports of each of the non-first-level wavelength division multiplexing units is used for receiving an incident optical signal and the other is used for receiving a combined optical signal outputted from a previous-level wavelength division multiplexing unit, and incident optical signals received by two adjacent non-first-level wavelength division multiplexing units have different polarization states, so that the wavelength division multiplexer finally outputs a combined optical signal of all optical signals. Therefore, even if the center wavelengths of the incident optical signals of the two adjacent non-first-level wavelength division multiplexing units are close to each other, there will be no crosstalk problem. The device has the characteristics of low loss, a relatively wide and flat-top passband, and pure passivity, and can solve the problem of crosstalk between adjacent channels that may be caused by center wavelength shifts of the device.

Embodiment 6

Figure 12:
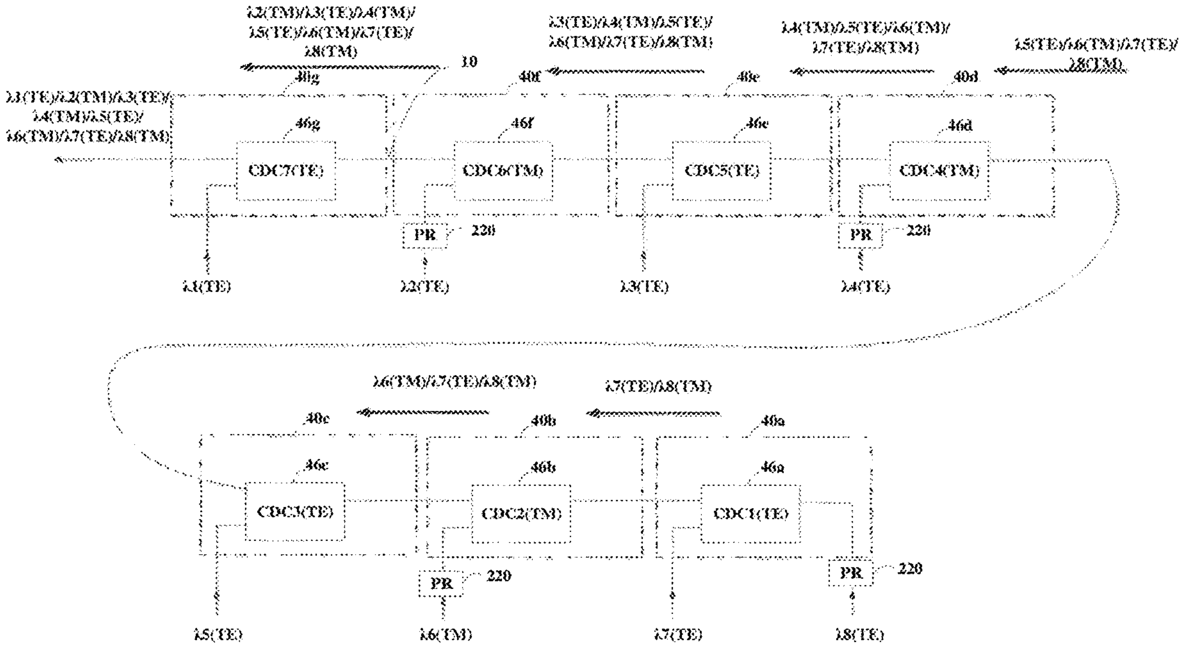
FIG. 12 is a structural diagram of an eight-channel on-chip integrated wavelength division multiplexer provided in yet another embodiment of the present disclosure.

FIG. 12 is a structural diagram of an eight-channel on-chip integrated wavelength division multiplexer provided in yet another embodiment of the present disclosure.

The difference between FIG. 12 and FIG. 10 is only that FIG. 12 implements the multiplexing of eight wavelengths of λ1, λ2, λ3, λ4, λ5, λ6, λ7, and λ8 (wavelengths in ascending order). Therefore, at least seven wavelength division multiplexing units need to be cascaded in FIG. 12. Specifically, the eight-channel on-chip integrated wavelength division multiplexer includes a first-level wavelength division multiplexing unit 40*a*, a second-level wavelength division multiplexing unit 40*b*, a third-level wavelength division multiplexing unit 40*c*, a fourth-level wavelength division multiplexing unit 40*d*, a fifth-level wavelength division multiplexing unit 40*e*, a sixth-level wavelength division multiplexing unit 40*f*, and a seventh-level wavelength division multiplexing unit 40*g* that are cascaded; and four polarization rotators 220. It should be understood that if more wavelengths are to be multiplexed, it can be achieved by increasing the quantity of cascaded wavelength division multiplexing units accordingly on the basis of FIG. 12. Further details will not be repeated here.

Optionally, in other embodiments of the present disclosure, the wavelength division multiplexing units in the on-chip integrated wavelength division multiplexer may be made of any of the following structures: a combined structure made of a mode multiplexer and a multimode Bragg grating, and a backward Bragg grating directional coupler structure. That is, the wavelength division multiplexing units in the same integrated wavelength division multiplexer may have different types of structure, with some of the wavelength division multiplexing units having a combined structure made of a mode multiplexer and a multimode Bragg grating, and some of the wavelength division multiplexing units having a backward Bragg grating directional coupler structure.

Embodiment 7

Figure 13:
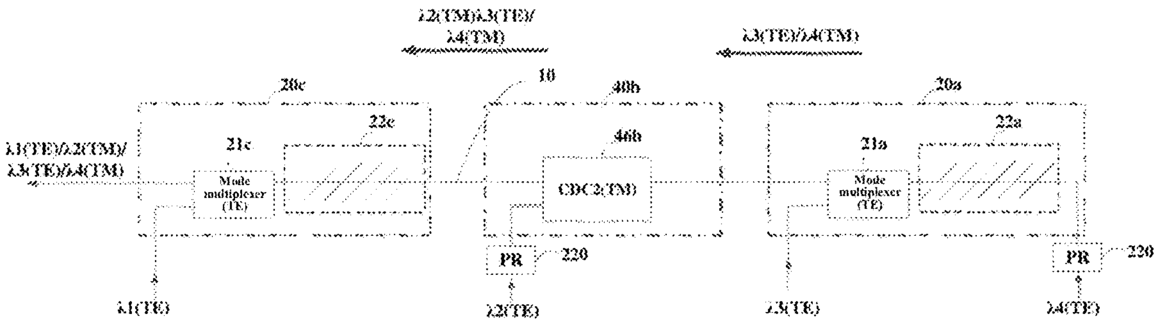
FIG. 13 is a structural diagram of a four-channel on-chip integrated wavelength division multiplexer provided in yet another embodiment of the present disclosure.

FIG. 13 is a structural diagram of a four-channel on-chip integrated wavelength division multiplexer provided in yet another embodiment of the present disclosure.

As shown in FIG. 13, the on-chip integrated wavelength division multiplexer in this embodiment includes a bus waveguide 10; a first-level wavelength division multiplexing unit 20*a*, a second-level wavelength division multiplexing unit 40*b*, and a third-level wavelength division multiplexing unit 20*c* that are cascaded and disposed on the bus waveguide 10; and two polarization rotators 220. Each of the wavelength division multiplexing units includes two input ports and one output port, and is used for combining two optical signals received by the two input ports and outputting the combined optical signal from the output port, so as to implement multiplexing of incident optical signals of different wavelengths. Starting from the first level of the cascaded wavelength division multiplexing units, four wavelengths λ1, λ2, λ3, and λ4 (arranged in ascending order) are respectively inputted in reverse order to the input ports in the three wavelength division multiplexing units 20*a*, 40*b*, and 40*c*. Here, the first-level wavelength division multiplexing unit 20*a* and the third-level wavelength division multiplexing unit 20*c* each includes a mode multiplexer 21*a*/21*c* and a multimode Bragg grating 22*a*/22*c*, and the second-level wavelength division multiplexing unit 40*b* includes a backward Bragg grating directional coupler structure 46*b*. The first-level wavelength division multiplexing unit 20*a* and the third-level wavelength division multiplexing unit 20*c* correspond to the first multimode Bragg grating 22*a* and the third multimode Bragg grating 22*c*, respectively. Each of the first multimode Bragg grating 22*a* and the third multimode Bragg grating 22*c* has a different grating period for respectively reflecting a light of wavelengths λ1 and λ3 and transmitting other remaining wavelengths. The backward Bragg grating directional coupler structures 46*b* in the second-level wavelength division multiplexing unit 40*b* includes the first backward Bragg grating directional coupling structure 461 and the second backward Bragg grating directional coupling structure 462. One input port of the two input ports of the second-level wavelength division multiplexing unit 40*b* receives the incident optical signal, and the other input port inputs the combined optical signal of the previous-level wavelength division multiplexing unit (the first-level wavelength division multiplexing unit 20*a*). Therefore, during operation, the incident optical signal λ2 (TE mode) is inputted to the polarization rotator 220 and then transformed into a TM mode. Next, the incident optical signal λ2 (TM mode) is inputted at the forward port of the second backward Bragg grating directional coupling structure 462 in the second-level wavelength division multiplexing unit 40*b*. A combined optical signal λ3 (TE)/λ4 (TM) outputted through the first-level wavelength division multiplexing unit 40*a* is inputted at the forward port of the first backward Bragg grating directional coupling structure 461 in the second-level wavelength division multiplexing unit 40*b*. Finally, they converge and couple at the forward port of the first backward Bragg grating directional coupling structure 461 of the second-level wavelength division multiplexing unit 40*b*, creating a combined optical signal λ2 (TM)/λ3 (TE)/λ4 (TM), so as to output the combined optical signal λ2 (TM)/λ3 (TE)/λ4 (TM) to a next-level wavelength division multiplexing unit.

Alternatively, in other embodiments, any of the wavelength division multiplexing units having a combined structure of a mode multiplexer and a multimode Bragg grating in FIG. 13 may be substituted with a backward Bragg grating directional coupler structure. Further details will not be repeated here.

The aforementioned at least two cascaded wavelength division multiplexing units have a hybrid structure made of a backward Bragg grating directional coupler structure and a combined structure of a mode multiplexer and a multimode Bragg grating; the at least two cascaded wavelength division multiplexing units can also realize the combining of a plurality of incident optical signals. And, one of the two input ports of each non-first-level wavelength division multiplexing unit is used for receiving an incident optical signal, the other is used for receiving a combined optical signal outputted from a previous-level wavelength division multiplexing unit, and incident optical signals received by two adjacent non-first-level wavelength division multiplexing units have different polarization states. Therefore, the wavelength division multiplexer finally outputs a combined optical signal of all optical signals. Therefore, even if the center wavelengths of the incident optical signals of the two adjacent non-first-level wavelength division multiplexing units are close to each other, there will be no crosstalk problem. The device has the characteristics of low loss, a relatively wide and flat-top passband, and pure passivity, and can solve the problem of crosstalk between adjacent channels that is caused by center wavelength shifts of the device.

Embodiment 8

Figure 14:
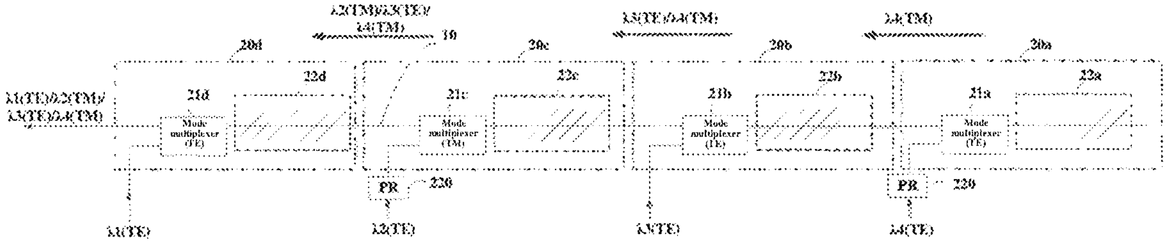
FIG. 14 is a structural diagram of a four-channel on-chip integrated wavelength division multiplexer provided in yet another embodiment of the present disclosure.

FIG. 14 is a structural diagram of a four-channel on-chip integrated wavelength division multiplexer provided in yet another embodiment of the present disclosure.

As shown in FIG. 14, in this embodiment, as compared to aforementioned embodiments, one of the two input ports of the first-level wavelength division multiplexing unit 20*a* is used for receiving a beam of incident optical signal having a polarization state, and the other is not used for receiving an optical signal. The rest of the implementation is similar to that of FIG. 2*b* and the description thereof will not be repeated here.

It should be understood that based on the description of the above embodiments, according to yet another embodiment of the present disclosure, the wavelength division multiplexer includes n cascaded wavelength division multiplexing units. The wavelength division multiplexing unit has a combined structure made of a mode multiplexer and a multimode Bragg grating that are connected, or a backward Bragg grating directional coupler structure, the wavelength division multiplexing unit has a 1 dB flat-top range. When n+1 beams of incident optical signal of wavelengths λ1, λ2 . . . λn+1 are inputted to the on-chip integrated wavelength division multiplexer, the on-chip integrated wavelength division multiplexer combines the n+1 beams of incident optical signal into one beam of light for output. Among the n+1 beams of incident optical signal, two beams of incident optical signal having adjacent wavelengths have opposite polarization states. Wavelengths of the n+1 beams of incident optical signal are near center wavelengths of the 1 dB flat-top ranges of the wavelength division multiplexing units. Here, n is a natural number greater than 1.

Furthermore, the 1 dB flat-top ranges of two wavelength division multiplexing units having adjacent center wavelengths partially overlap.

Furthermore, a width of the 1 dB flat-top range of the wavelength division multiplexing unit is 20-50 nm.

Furthermore, the center wavelengths of two wavelength division multiplexing units having adjacent center wavelengths are 15-25 nm apart.

Furthermore, the on-chip integrated wavelength division multiplexer further includes a polarization rotator; the polarization rotator is connected to the wavelength division multiplexing unit; the polarization rotator rotates the polarization state of a light inputted to the wavelength division multiplexing unit, so as to cause two beams of incident optical signal having adjacent wavelengths among the n+1 beams of incident optical signal inputted to the wavelength division multiplexing unit to have opposite polarization states.

Furthermore, some of the wavelength division multiplexing units in the on-chip integrated wavelength division multiplexer have a combined structure made of a mode multiplexer and a multimode Bragg grating that are connected, and some other wavelength division multiplexing units have a backward Bragg grating directional coupler structure.

Furthermore, the structure of each of the wavelength division multiplexing units is adapted to process an incident optical signal of a corresponding polarization state and a corresponding wavelength.

The present disclosure further provides a chip, including the on-chip integrated wavelength division multiplexer of any of the embodiments above.

In the on-chip integrated wavelength division multiplexer and chip provided by this embodiment of the present disclosure, the wavelength division multiplexer includes a bus waveguide and at least two cascaded wavelength division multiplexing units disposed on the bus waveguide. Each of the wavelength division multiplexing units includes two input ports and one output port, and is used for combining two optical signals received by the two input ports and outputting the combined optical signal from the output port. The two input ports of the first-level wavelength division multiplexing unit are used for receiving incident optical signals having different polarization states, thus enabling the combining of incident optical signals having similar center wavelengths. And, one of the two input ports of each of the non-first-level wavelength division multiplexing unit is used for receiving an incident optical signal and the other is used for receiving a combined optical signal outputted from a previous-level wavelength division multiplexing unit, and incident optical signals received by two non-first-level wavelength division multiplexing units corresponding to adjacent input center wavelengths have different polarization states, so as to realize multiplexing of incident optical signals of different wavelengths. The on-chip integrated wavelength division multiplexer provided by this embodiment of the present disclosure has characteristics such as low loss, a relatively wide and flat-top passband, and pure passivity, and can solve the problem of crosstalk between adjacent channels that may be caused by center wavelength shifting of a wavelength division multiplexing device.

In the above embodiments, the description of each embodiment has its own focus, and aspects of an embodiment that are not described in detail can be found in relevant descriptions of other embodiments.

The on-chip integrated wavelength division multiplexer and chip provided by the present disclosure are described in detail above in conjunction with the embodiments, and specific examples are used herein to explain the principles and implementation of the present disclosure. The description of the above embodiments is only used to assist in the understanding of the technical solutions and core ideas of the present disclosure. Persons of ordinary skill in the art should understand that: it is still possible for them to modify the technical solutions documented in the above embodiments or to make equivalent substitutions for some of the technical features therein; however, these modifications or substitutions do not cause the essence of the corresponding technical solutions to depart from the scope of the technical solutions of embodiments of the present disclosure.

The invention claimed is:

1. An on-chip integrated wavelength division multiplexer, comprising a bus waveguide and at least three cascaded wavelength division multiplexing units disposed on the bus waveguide, the at least three cascaded wavelength division multiplexing units comprising a first-level wavelength division multiplexing unit and at least two non-first-level wavelength division multiplexing units;

wherein each of the wavelength division multiplexing units comprises two input ports and one output port, and is used for combining two optical signals received by the two input ports and outputting the combined optical signal from the output port;

wherein the two input ports of the first-level wavelength division multiplexing unit are used for receiving incident optical signals having different polarization states, respectively, or, one of the two input ports of the first-level wavelength division multiplexing unit is used for receiving one beam of incident optical signal having a polarization state, and the other is not used for receiving any optical signal;

one of the two input ports of each of the non-first-level wavelength division multiplexing units is used for receiving an incident optical signal and the other is used for receiving a combined optical signal outputted from a previous-level wavelength division multiplexing unit, and incident optical signals received by two of the non-first-level wavelength division multiplexing units corresponding to adjacent input center wavelengths have different polarization states; and wherein each of the incident optical signals has a different wavelength.

2. The on-chip integrated wavelength division multiplexer according to claim 1, wherein each of the wavelength division multiplexing units is made of any of the following structures: a combined structure made of a mode multiplexer and a multimode Bragg grating, or a backward Bragg grating directional coupler structure.

3. The on-chip integrated wavelength division multiplexer according to claim 1, wherein the wavelength division multiplexer further comprises at least one polarization rotator for receiving an original incident optical signal and changing a polarization state of the original incident optical signal, all original incident optical signals having the same polarization state, wherein, for the two input ports of the first-level wavelength division multiplexing unit that are used for receiving incident optical signals having different polarization states, respectively, one of the two input ports of the first-level wavelength division multiplexing unit receives the optical signal whose polarization state has been changed from the original incident optical signal by a corresponding polarization rotator as the incident optical signal, and the other input port directly receives the original incident optical signal as its incident optical signal;

for two adjacent ones of the non-first-level wavelength division multiplexing units, one of the input ports receives the optical signal whose polarization state has been changed from the original incident optical signal by a corresponding polarization rotator as the incident optical signal, and the other input port directly receives the original incident optical signal as its incident optical signal.

4. The on-chip integrated wavelength division multiplexer according to claim 3, wherein each of the polarization rotators changes an original polarization state of the original incident optical signal received to a polarization state perpendicular to the original polarization state.

5. The on-chip integrated wavelength division multiplexer according to claim 4, wherein a difference between center wavelengths of two incident optical signals having adjacent wavelengths in a same polarization state is greater than a preset wavelength difference threshold.

6. The on-chip integrated wavelength division multiplexer according to claim 5, wherein there is a predetermined wavelength spacing between each of the incident optical signals, and a corresponding input port of the wavelength division multiplexing unit of the first level and the non-first level receive its corresponding incident optical signal in forward or reverse order of the magnitude of its wavelength starting from the first level of the cascaded wavelength division multiplexing units.

7. The on-chip integrated wavelength division multiplexer according to claim 1, wherein an optical waveguide material of the on-chip integrated wavelength division multiplexer is any of silicon, silicon nitride, silicon oxynitride, doped silicon dioxide, lithium niobate, and a III-V semiconductor material.

8. The on-chip integrated wavelength division multiplexer according to claim 1, wherein the wavelength division multiplexing unit of each level has a combined structure made of a mode multiplexer and a multimode Bragg grating;

wherein, for each of the wavelength division multiplexing units:

the mode multiplexer in the wavelength division multiplexing unit comprises a first port, a second port, and a third port, the first port and the second port being used for outputting a combined optical signal and receiving the corresponding incident optical signal, respectively, and the third port being connected to an output port of the multimode Bragg grating in the wavelength division multiplexing unit;

if the wavelength division multiplexing unit is one of the non-first-level wavelength division multiplexing units, then one end of the multimode Bragg grating in the wavelength division multiplexing unit is used for receiving a combined optical signal outputted from a previous-level wavelength division multiplexing unit, and another end is connected to the third port of the mode multiplexer in the wavelength division multiplexing unit;

if the wavelength division multiplexing unit is the first-level wavelength division multiplexing unit, then one end of the multimode Bragg grating in the wavelength division multiplexing unit is used for receiving a corresponding incident optical signal, and another end is connected to the third port of the mode multiplexer in the wavelength division multiplexing unit; or if the wavelength division multiplexing unit is the first-level wavelength division multiplexing unit, then one end of the multimode Bragg grating in the wavelength division multiplexing unit is connected only to the third port of the mode multiplexer in the wavelength division multiplexing unit.

9. The on-chip integrated wavelength division multiplexer according to claim 8, wherein each of the mode multiplexers comprises a straight-through waveguide and a cross waveguide; two ends of the straight-through waveguide serve as the first port and the third port, respectively, and one end of the cross waveguide near the first port serves as the second port;

wherein the straight-through waveguide and the cross waveguide are used for mode coupling.

10. The on-chip integrated wavelength division multiplexer according to claim 9, wherein for each wavelength division multiplexing unit, a grating period of the multimode Bragg grating matches a wavelength of an original incident optical signal of the wavelength division multiplexing unit.

11. The on-chip integrated wavelength division multiplexer according to claim 1, wherein the wavelength division multiplexing unit of each level is made of a backward Bragg grating directional coupler structure;

the backward Bragg grating directional coupler in the wavelength division multiplexing unit comprises a fourth port, a fifth port, and a sixth port, the fourth port and the fifth port being used for receiving the corresponding incident optical signal and outputting a combined optical signal, respectively;

if the wavelength division multiplexing unit is one of the non-first-level wavelength division multiplexing units, then the sixth port of the backward Bragg grating directional coupler in the wavelength division multiplexing unit is used for receiving a combined optical signal outputted from a previous-level wavelength division multiplexing unit;

if the wavelength division multiplexing unit is the first-level wavelength division multiplexing unit, then the sixth port of the backward Bragg grating directional coupler in the wavelength division multiplexing unit is used for receiving a corresponding incident optical signal.

12. The on-chip integrated wavelength division multiplexer according to claim 1, wherein a spectrum of the incident optical signal of each of the wavelength division multiplexing units comprises at least one 1 dB flat-top, wherein, each of the 1 dB flat-tops is a wavelength range corresponding to a 1 dB optical attenuation range, and each 1 dB flat-top corresponds to a wavelength range greater than 12 nanometers.

13. The on-chip integrated wavelength division multiplexer according to claim 12, wherein the wavelength range corresponding to the 1 dB flat-top in the spectrum of the incident optical signal of each of the wavelength division multiplexing units partially overlaps with the wavelength range corresponding to the 1 dB flat-top in the spectrum of the incident optical signal of another adjacent wavelength division multiplexing unit.

14. A chip, comprising the on-chip integrated wavelength division multiplexer according to claim 1.

15. An on-chip integrated wavelength division multiplexer, wherein the wavelength division multiplexer comprises n cascaded wavelength division multiplexing units;

each of the wavelength division multiplexing units has a combined structure made of a mode multiplexer and a multimode Bragg grating that are connected, or a backward Bragg grating directional coupler structure;

each of the wavelength division multiplexing units has a 1 dB flat-top range;

when n+1 beams of an incident optical signal of wavelengths λ1, λ2 . . . λn+1 are inputted to the on-chip integrated wavelength division multiplexer, the on-chip integrated wavelength division multiplexer combines the n+1 beams of the incident optical signal into one beam of light for output;

among the n+1 beams of the incident optical signal, two beams of the incident optical signal having adjacent wavelengths have opposite polarization states;

wavelengths of the n+1 beams of the incident optical signal are near center wavelengths of the 1 dB flat-top ranges of the wavelength division multiplexing units;

wherein n is a natural number greater than 1.

16. The on-chip integrated wavelength division multiplexer according to claim 15, wherein the 1 dB flat-top ranges of two wavelength division multiplexing units having adjacent center wavelengths partially overlap.

17. The on-chip integrated wavelength division multiplexer according to claim 16, wherein a width of the 1 dB flat-top range of the wavelength division multiplexing unit is 20-50 nm.

18. The on-chip integrated wavelength division multiplexer according to claim 16, wherein the center wavelengths of two of the wavelength division multiplexing units having adjacent center wavelengths are 15-25 nm apart.

19. The on-chip integrated wavelength division multiplexer according to claim 16, wherein the on-chip integrated wavelength division multiplexer further comprises a polarization rotator; the polarization rotator is connected to the wavelength division multiplexing unit; the polarization rotator rotates a polarization state of a light inputted to the wavelength division multiplexing unit, so as to cause two beams of the incident optical signal having adjacent wavelengths among the n+1 beams of the incident optical signal inputted to the wavelength division multiplexing unit to have opposite polarization states.

20. The on-chip integrated wavelength division multiplexer according to claim 16, wherein some of the wavelength division multiplexing units in the on-chip integrated wavelength division multiplexer have a combined structure made of a mode multiplexer and a multimode Bragg grating that are connected, and some other of the wavelength division multiplexing units have a backward Bragg grating directional coupler structure.

21. The on-chip integrated wavelength division multiplexer according to claim 16, wherein the structure of each of the wavelength division multiplexing units is adapted to process an incident optical signal of a corresponding polarization state and a corresponding wavelength.

* * * * *